US008731052B2

(12) United States Patent
Fuchie

(10) Patent No.: US 8,731,052 B2
(45) Date of Patent: May 20, 2014

(54) IMAGE PROCESSING DEVICE AND IMAGE PROCESSING METHOD WITH FEEDBACK CONTROL

(75) Inventor: Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 12/673,269

(22) PCT Filed: Jun. 23, 2009

(86) PCT No.: PCT/JP2009/061805
§ 371 (c)(1),
(2), (4) Date: Feb. 12, 2010

(87) PCT Pub. No.: WO2009/157579
PCT Pub. Date: Dec. 30, 2009

(65) Prior Publication Data
US 2011/0176606 A1 Jul. 21, 2011

(30) Foreign Application Priority Data
Jun. 27, 2008 (JP) ................ P2008-169397

(51) Int. Cl.
*H04N 7/12* (2006.01)
(52) U.S. Cl.
USPC .................................................. 375/240.05
(58) Field of Classification Search
USPC ........................ 375/240.01, 240.05
IPC .......................................................... H04N 7/12
See application file for complete search history.

(56) References Cited

U.S. PATENT DOCUMENTS 4,791,483 A * 12/1988 Miller .................. 375/240.01
5,073,820 A 12/1991 Nakagawa et al.

(Continued)

FOREIGN PATENT DOCUMENTS

CN 1195943 10/1998
CN 1241336 1/2000

(Continued)

OTHER PUBLICATIONS

Joint Final Committee Draft (JFCD) of Joint Video Specification (ITU-T Rec. H. 264 / ISO/IEC 14496-10 AVE) (JVT-D157), [online], ITU-T/ ISO/IEC, Jul. 22, 2002, URL:http://wftp3.itu.int/av-arch/jvt-site/2002_07_Klagenfurt/JVT-D157.zip, p. i, 83-90.

(Continued)

*Primary Examiner* — Dave Czekaj
*Assistant Examiner* — Tracy Li
(74) *Attorney, Agent, or Firm* — Frommer Lawrence & Haug LLP; William S. Frommer

(57) ABSTRACT

The present invention can suppress the generated code quantity for each image increment so as not to exceeding the target code quantity without having a usage quantizing factor deviate greatly in a sure manner.
An image encoding device (200) determines a basic quantization parameter ($QP_{MB}$) serving as a basic quantizing factor to be predicted in the case that the main encoding generated code comes near the target code quantity at the time of encoding an input image (91). The image encoding device (200) encodes the input image (91) for each feedback control increment by executing quantization using an adapted quantization parameter (QPt) based on an average quantization parameter BaseQP serving as a usage quantization factor determined based on at least the basic quantization parameter ($QP_{MB}$). The image encoding device (200) confirms the generated code quantity of the encoded input image (91) for each feedback control increment, and in the case of predicting that the generated code quantity for each image increment will exceed the target code quantity, increases the value of the adapted quantization parameter (QPt) by increasing the average quantization parameter BaseQP.

15 Claims, 6 Drawing Sheets

(56) References Cited

U.S. PATENT DOCUMENTS

| | | |
|---|---|---|
| 5,245,427 A | 9/1993 | Kunihiro |
| 5,528,298 A | 6/1996 | Enari et al. |
| 5,604,494 A | 2/1997 | Murakami et al. |
| 5,612,900 A | 3/1997 | Azadegan et al. |
| 5,703,646 A | 12/1997 | Oda |
| 5,721,589 A | 2/1998 | Murata |
| 5,838,826 A | 11/1998 | Enari et al. |
| 5,870,145 A | 2/1999 | Yada et al. |
| 5,933,532 A | 8/1999 | Mihara |
| 6,014,467 A | 1/2000 | Asano |
| 6,023,297 A * | 2/2000 | Kobayashi ............... 375/240.03 |
| 6,052,488 A | 4/2000 | Takahashi et al. |
| 6,100,931 A | 8/2000 | Mihara |
| 6,163,573 A | 12/2000 | Mihara |
| 6,337,879 B1 | 1/2002 | Mihara et al. |
| 6,404,933 B1 | 6/2002 | Yamamoto |
| 6,438,167 B1 | 8/2002 | Shimizu et al. |
| 6,493,384 B1 | 12/2002 | Mihara |
| 6,678,322 B1 | 1/2004 | Mihara |
| 6,934,330 B2 | 8/2005 | Sugiyama et al. |
| 7,286,715 B2 | 10/2007 | Togashi et al. |
| 7,313,184 B2 | 12/2007 | Mihara |
| RE40,679 E | 3/2009 | Oda |
| 7,885,471 B2 | 2/2011 | Segall |
| 2003/0016878 A1 | 1/2003 | Motosu et al. |
| 2005/0180505 A1 | 8/2005 | Ogawa et al. |
| 2005/0259730 A1 | 11/2005 | Sun |
| 2006/0062481 A1 | 3/2006 | Suvanto |
| 2006/0171460 A1 | 8/2006 | Masuda et al. |
| 2007/0071094 A1 * | 3/2007 | Takeda et al. ............ 375/240.04 |
| 2007/0201553 A1 | 8/2007 | Shindo |
| 2008/0279275 A1 | 11/2008 | Suzuki |
| 2009/0067738 A1 | 3/2009 | Fuchie et al. |
| 2010/0098173 A1 | 4/2010 | Horiuchi et al. |
| 2010/0118971 A1 | 5/2010 | Tanida et al. |
| 2010/0135386 A1 | 6/2010 | Shibata et al. |
| 2010/0266047 A1 | 10/2010 | Takahashi et al. |
| 2011/0090960 A1 | 4/2011 | Leontaris et al. |
| 2011/0103480 A1 | 5/2011 | Dane |
| 2011/0188769 A1 | 8/2011 | Fuchie et al. |
| 2011/0200266 A1 | 8/2011 | Fuchie et al. |

FOREIGN PATENT DOCUMENTS

| | | |
|---|---|---|
| CN | 1642285 | 7/2005 |
| EP | 0 871 333 | 10/1998 |
| EP | 0 892 561 | 1/1999 |
| EP | 1 555 831 | 7/2005 |
| EP | 2 028 865 | 2/2009 |
| JP | 4 114585 | 4/1992 |
| JP | 4135427 | 5/1992 |
| JP | 6 350985 | 12/1994 |
| JP | 7 123273 | 5/1995 |
| JP | 7 322252 | 12/1995 |
| JP | 8 65677 | 3/1996 |
| JP | 8 115205 | 5/1996 |
| JP | 9-247675 | 9/1997 |
| JP | 10 23413 | 1/1998 |
| JP | 10 174098 | 6/1998 |
| JP | 10 341435 | 12/1998 |
| JP | 11 98502 | 4/1999 |
| JP | 2000 261805 | 9/2000 |
| JP | 2000 270323 | 9/2000 |
| JP | 3264043 | 12/2001 |
| JP | 3358620 | 10/2002 |
| JP | 2002 359853 | 12/2002 |
| JP | 2004 7475 | 1/2004 |
| JP | 2004 56680 | 2/2004 |
| JP | 3561962 | 6/2004 |
| JP | 2005 203905 | 7/2005 |
| JP | 2006 67302 | 3/2006 |
| JP | 2006 222555 | 8/2006 |
| JP | 2007 158430 | 6/2007 |
| KR | 10-0264710 | 9/2000 |
| KR | 10-2005-0074286 | 7/2005 |
| WO | WO 98/26602 | 6/1998 |
| WO | WO 99 07158 | 2/1999 |
| WO | WO 2008 065814 | 6/2008 |

OTHER PUBLICATIONS

Final Office Action issued on Dec. 9, 2011 in related U.S. Appl. No. 12/207,611.
Non-Final Office Action Issued on Aug. 25, 2011 in related U.S. Appl. No. 12/207,611.
Viscito E. et al.; "A Video Compression Algorithm with Adaptive BitAllocation and Quantization", Visual Communication and Image Processing '91: Visual Communication. Boston, Nov. 11-13, 1991; [Proceedings of SPIE], Bellingham, SPIE, US, vol. 1605 Part 01/02, Nov. 11, 1991, pp. 58-72, XP000479218.
Office Action issued in corresponding Chinese patent application No. 200810212084.X on Feb. 24, 2010 and its English translation.
Joint Video Team (JVT) of ISO/IEC MPEG and ITU-T VCEG, document JVT-C028, Virginia, May 2002.

* cited by examiner

IMAGE PROCESSING DEVICE AND IMAGE PROCESSING METHOD WITH FEEDBACK CONTROL

TECHNICAL FIELD

The present invention relates to, for example, an image encoding device or the like, and specifically relates to a technical field for adding a generated code quantity to the target code quantity given to one picture without executing intra-screen feedback control.

BACKGROUND ART

Heretofore, with a system or the like for transmitting a moving image or recording this in a recording medium, high-efficiency encoding has been carried out to take advantage of a transmission path or recording capacity effectively. With an image encoding device for realizing this, the encoding bit rate of a bit stream generated at an encoder is set to be a certain rate according to the transfer rate of a transmission medium, and under this restriction, a data generated quantity, i.e., the quantizing step of quantization at the encoder is controlled. That is to say, the image encoding device suppresses the data generated quantity by increasing the quantizing step, for example, when images having a complicated picture pattern continue, and conversely, when picture images having a simple picture pattern continue, a fixed rate is held so as not to cause overflow or underflow of buffer memory by reducing the quantizing step and increasing a data generated quantity.

Accordingly, with an image encoding device according to such a conventional technique, when complicated images continue, the quantizing step increases, and image quality deteriorates, and when simple images continue, the quantizing step decreases, and uniform image quality is not available as a whole. In the light of this problem, for example, with Patent Document 1, an image encoding device has been disclosed wherein an assigned code quantity to be assigned to each GOP itself in accordance with the ratio of sum of encoding difficulty for each GOP (Group Of Pictures), and encoding difficulty for multiple GOPs, is assigned more to a GOP including an image having a complicated picture pattern, and is assigned less to a GOP including an image having a simple picture pattern.

On the other hand, as a method for adding a generated code quantity to the target code quantity given to one picture, for example, the step 2 of TM5 (test model 5) has been known well. This is a technique wherein the code quantity assigned to a picture distributed to macro blocks (MB; Macro block) is taken as the target code quantity of the MBs, and feedback control is applied within the picture.

Also, with the encoding processing of a redundant compressing method such as MPEG or the like, the image encoding device executes quantization processing after subjecting to orthogonal transform such as DCT (Discrete Cosine Transform) or the like, thereby executing processing for reducing information volume. Subsequently, the image encoding device controls the value of this quantization to execute control of code quantity. At this time, a monotonous reduction relationship holds between the quantization parameters and the generated code quantity. Therefore, the image encoding device computes a code quantity with the quantizing value of an appropriate interval, and subjects the predictive value of the code quantity positioned in the intermediated thereof to linear interpolation, or the like, whereby the generated code quantity can be predicted (binary search or the like to be executed with intra VTR such as DV or the like).

This method may be applied to not only an encoding method using a fixed table such as MPEG2 or the like but also a context adaptive encoding method used for AVC or the like.

Patent Document 1: Japanese Patent No. 3358620

However, with the above method in the step 2 of TM5, with encoding of a first picture in a sequence or a picture immediately after change in scenes, the initial value of the quantizing step is unmatched with the picture pattern of the picture thereof, and accordingly, there are cases where image quality deteriorates.

For example, with the method in the step 2 of TM5, with the image encoding device, in the case that the quantizing step of a portion up to where feedback follows the picture pattern is too great, the image quality of the portion thereof will be deteriorated as compared to other portions, and in the case that the quantized value is too small, the code quantity is excessively used at this portion, which may affect other portions.

Also, with the image encoding device, the target code quantity of MBs is set to be a certain code quantity constantly, and accordingly, inappropriate code quantity distribution is caused when there is a deviation regarding image difficulty within the screen, or the like.

Accordingly, it is an object of the present invention to suppress the generated code quantity for each image increment below the target code quantity in a sure manner without the usage quantizing factor, serving as the basis of the quantizing step, deviating greatly.

DISCLOSURE OF INVENTION

With an image processing device according to the present invention for solving such a problem, there are provided a basic quantizing factor determining unit configured to determine a basic quantizing factor regarding which is predicted that the generated code quantity for each image increment when encoding an input image will approximate to the target code quantity for the each image increment; an encoding unit configured to encode the input image for each feedback control increment by executing quantization using a usage quantizing factor determined based on at least the basic quantizing factor; and a feedback control unit configured to confirm the generated code quantity of the input image encoded by the encoding unit for the each feedback control increment, and in the case of predicting that the generated code quantity for the each image increment will exceed the target code quantity for the each image increment, increase the usage quantizing factor.

Thus, the image processing device only increases the usage quantizing factor under restricted conditions, whereby fluctuation of the usage quantizing factor can be suppressed to the minimum.

Also, with an image processing method according to the present invention, there are provided a basic quantizing factor determining step arranged to determine a basic quantizing factor regarding which is predicted that the generated code quantity for each image increment when encoding an input image will approximate to the target code quantity for the each image increment; an encoding step arranged to encode the input image for each feedback control increment to generate an encoded stream by executing quantization using a usage quantizing factor determined based on at least the basic quantizing factor; and a feedback control step arranged to confirm the generated code quantity of the input image encoded in the encoding step for the each feedback control increment, and in the case of predicting that the generated code quantity for the each image increment will exceed the target code quantity for the each image increment, increase the usage quantizing factor.

Thus, the image processing method only increases the usage quantizing factor under restricted conditions, whereby fluctuation of the usage quantizing factor can be suppressed to the minimum.

According to the present invention, the usage quantizing factor is only increased under restricted conditions, whereby fluctuation of the usage quantizing factor can be suppressed to the minimum. Thus, an image processing device and an image processing method can be realized, whereby the generated code quantity for each image increment can be suppressed below the target code quantity in a sure manner without the usage quantizing factor deviating greatly.

BEST MODES FOR CARRYING OUT THE INVENTION

Figure 1:
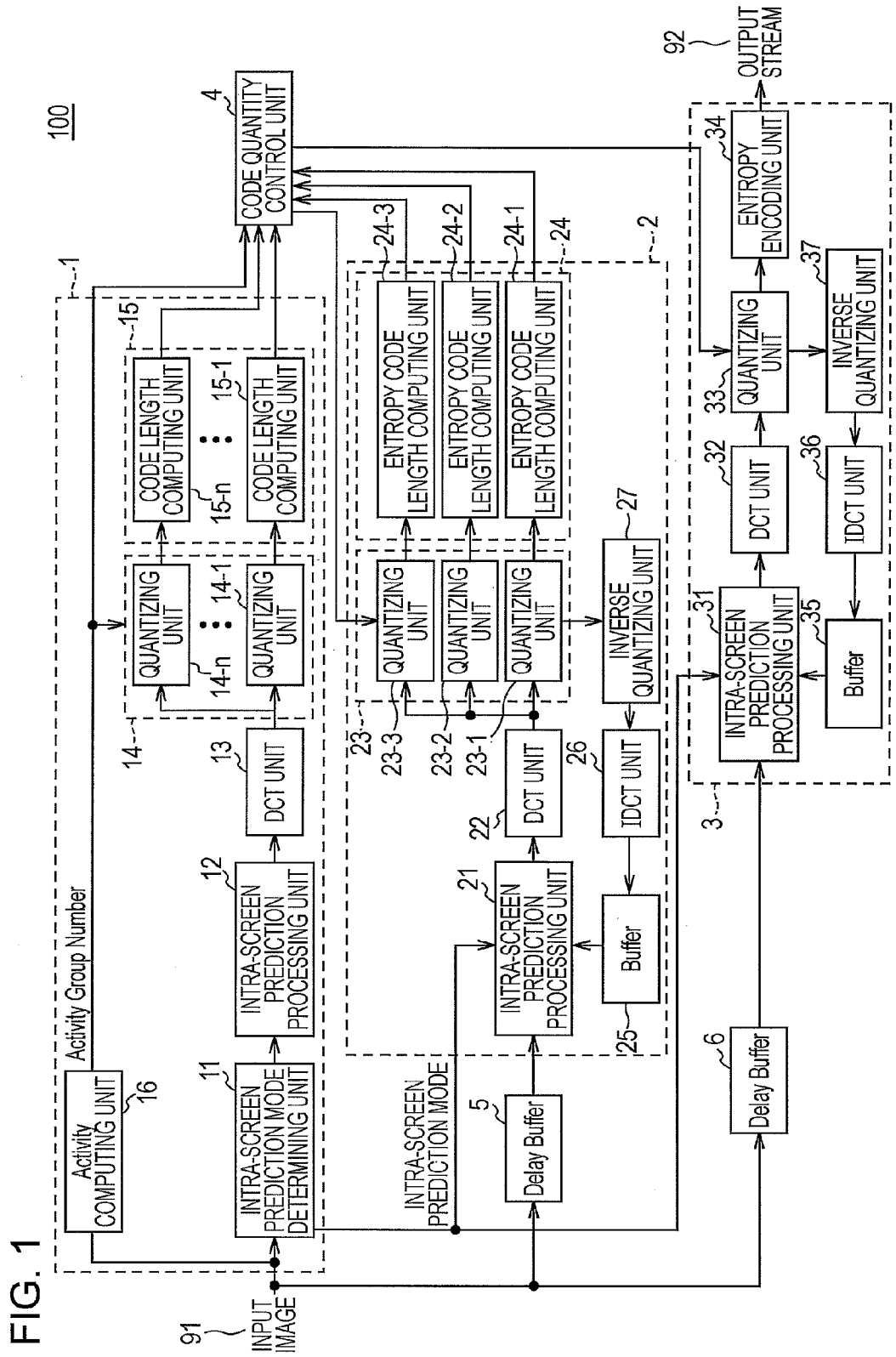
FIG. 1 is a configuration diagram of an image encoding device according to a first embodiment of the present invention.

Best modes for carrying out the present invention (hereafter, simply referred to as embodiments) will be described in detail with reference to the drawings. Note that description will be made in accordance with the following sequence.

1. First Embodiment (speculation of a generated code quantity using discrete selected quantization parameters)
2. Second Embodiment (feedback control)
3. Other Embodiments <1. First Embodiment>
[1-1. Features of the Present Invention]

An image encoding device 100 and an image encoding method, according to the present embodiment have the following features and the like.

The image encoding device 100 employs an image compression method using arithmetic coding represented with H.264/AVC (Advanced Video Coding; advanced moving image compression coding standard). The image encoding device 100 combines parallel pre-encoding (Pre Encode) and serial pre-encoding. Thus, the image encoding device 100 executes prediction with excellent precision while suppressing circuit scale and increase in Latency (delay time).

More specifically, the image encoding device 100 executes quantization and code length computation portion alone in parallel by first and second pre-encoding units 1 and 2, and shares other processing elements, thereby realizing reduction of a circuit scale according to circuit sharing.

That is to say, originally, in the case of executing parallel pre-encoding, though all the processing elements need to be provided in parallel, with the image encoding device 100 according to the present embodiment, a processing element that can be shared without affecting precision is determined in a sure manner, and the circuit regarding this processing element is shared. Thus, increase in the circuit scales of the first and second pre-encoding units 1 and 2, and latency (delay time) is suppressed.

With the first pre-encoding unit 1, parallel pre-encoding wherein precision is decreased, and the circuit scale and processing load are suppressed, is executed with a wide range of quantization parameters (QP), and a QP for realizing the target code quantity is roughly estimated. With the second pre-encoding unit 2, parallel pre-encoding of which the precision is increased is executed with a narrow range, and a basic quantization parameter $QP_{MB}$ used at a main encoding unit 3 is determined. As described above, the image encoding device 100 reduces processing load while increasing image encoding precision. Further, error due to simplifying the pre-encoding has relationship with a bit rate and quantization parameters QP, and accordingly, statistical model such as described later in detail is created beforehand, correction of the error is executed based on the bit rate and the quantization parameters QP.

FIG. 1 illustrates and describes the configuration of the image encoding device 100 according to an embodiment of the present invention.

This image encoding device 100 includes a first pre-encoding unit 1, a second pre-encoding unit 2, a main encoding unit 3, a code quantity control unit 4, and delay buffers 5 and 6.

The first pre-encoding unit 1 is a module for executing first pre-encoding, and includes an intra-screen prediction mode determining unit 11, an intra-screen prediction processing unit 12, a DCT (Discrete Cosine Transform) unit 13, a quantizing unit 14, an entropy code length computing unit 15, and an activity (Activity) computing unit 16.

The second pre-encoding unit 2 is a module for executing second pre-encoding, and includes an intra-screen prediction processing unit 21, a DCT unit 22, a quantizing unit 23, an entropy code length computing unit 24, a buffer 25, an IDCT (Inverse DCT) unit 26, and an inverse quantizing unit 27.

The main encoding unit 3 is a module for executing the main encoding, and includes an intra-screen prediction processing unit 31, a DCT unit 32, a quantizing unit 33, an entropy encoding unit 34, a buffer 35, an IDCT unit 36, and an inverse quantizing unit 37.

The code quantity control unit 4 is a module for executing code quantity control.

[1-2. Prediction of Quantization Parameters and Quantization Matrixes]
[1-2-1. Calculation of Low-precision Generated Code Quantity]

The image encoding device 100 adaptively selects and uses, for example, three quantization matrixes Q Matrix according to encoding difficulty (described later in detail). The image encoding device 100 sets a quantization matrix Q Matrix, and roughly estimates a generated code quantity using simple processing by the first pre-encoding unit 1 regarding quantization parameters QP in a range that the set quantization matrix Q Matrix can take. Hereafter, this generated code quantity estimated as the results of the pre-encoding unit 1 will be referred to as a low-precision generated code quantity. The image encoding device 100 executes similar processing regarding all the quantization matrixes Q Matrix, and calculates a low-precision generated code quantity when changing a quantization matrix Q Matrix and a quantization parameter QP. With the image encoding device 100, the quantization parameter QP and the quantization matrix Q Matrix of which the low-precision generated code quantity is the most approximate to the target code quantity will be taken as a prediction quantization parameter QPd used as the average quantization parameter Base QP of the picture in the next step (second pre-encoding unit 2), and the quantization matrix Q Matrix of the picture used in the next step (hereafter, referred to as "predictive quantization matrix Q MatrixD").

At this time, the image encoding device 100 uses a part discretely selected of the quantization parameters QP (hereafter, referred to as "selected quantization parameters QP1") to calculate a low-precision generated code quantity of the input image 91. The image encoding device 100 calculates a low-precision generated code quantity between the selected quantization parameters QP1 by interpolation, thereby calculating a low-precision generated code quantity regarding all the quantization parameters QP in a range that the quantization matrixes Q Matrix can take.

In practice, the input image 91 is input to the intra-screen prediction mode determining unit 11 of the first pre-encoding unit 1 first. The intra-screen prediction mode determining unit 11 generates difference image data according to all the intra-screen prediction modes based on the input image 91, and also determines the intra-screen prediction mode based on the prediction of the generated coded quantity of this difference image data. The prediction mode (predictive direction) is determined from nine types of prediction mode in increments of the minimum 4×4 pixels.

This determined intra-screen prediction mode is transmitted to the intra-screen prediction processing unit 12, and is also transmitted to the second pre-encoding unit 2 and the main encoding unit 3. This intra-screen prediction mode is used for the second pre-encoding by the second pre-encoding unit 2, and the main encoding by the main encoding unit 3.

Next, the intra-screen prediction processing unit 12 computes the difference image between the predictive image and the input image 91 to generate difference image data. The predictive image used here is created from the input image 91 to reduce the processing. Thus, the first pre-encoding unit 1 executes intra-screen prediction processing using an input image, whereby the inverse quantizing unit, IDCT unit, and buffer can be reduced, and the circuit scale can be reduced.

Upon executing integer precision DCT processing as to the difference image data to generate DCT coefficients, the DCT unit 13 transmits these to the quantizing unit 14. Upon executing quantization as to the DCT coefficients to generate quantization coefficients, the quantizing unit 14 transmits these to the entropy code length computing unit 15. The entropy code length computing unit 15 applies the context-adaptive variable length coding method (CAVLC; Context-Adaptive Variable Length Coding) to the quantization coefficients, thereby calculating code quantity. According to CAVLC, a high-efficiency encoding method can be adaptively selected according to a surrounding situation.

Thus, with the first pre-encoding, in the case that CABAC (Context-Adaptive Binary Arithmetic Coding) is used as an entropy encoding method with the main encoding, it is one of the features to use CAVLC for code quantity calculation. Note that CABAC means a context-adaptive binary arithmetic coding method.

Here, the quantizing unit 14 is configured of quantizing units 14-1, ..., 14-$n$ ($n$=1, 2, 3, provided in parallel, and the entropy code length computing unit 15 is configured of entropy code length computing units 15-1, ..., 15-$n$ ($n$=1, 2, 3, provided in parallel. The value of n is set to 15, for example. The quantizing unit 14 sets, of the quantization parameters QP made up of 0 through 51, the selected quantization parameter QP1 corresponding to the set quantization matrix Q Matrix to each of the quantizing units 14-1, ..., 14-$n$. This selected quantization parameter QP1 is selected discretely with an arbitrary interval from a range of the quantization parameters QP that the quantization matrix Q Matrix can take. Note that the selected quantization parameter QP1 may be selected with a certain interval for example, or may be selected with an interval that changes according to the value of the quantization parameter QP. Under such an arrangement, the first pre-encoding unit 1 executes quantization and code length calculation as to the multiple quantization parameters QP of which the number is the same as the above parallel number in parallel, and outputs each generated code quantity to the code quantity control unit 4.

That is to say, the first pre-encoding unit 1 executes first pre-encoding with a wide range of quantization parameters QP using parallel pre-encoding whereby the circuit scale associated with the quantizing unit 14 and the entropy code length computing unit 15 is suppressed, thereby calculating generated code quantity as to the wide range of quantization parameters QP.

Here, the activity computing unit 16 computes activity (Activity) in parallel with determination of the intra-screen prediction mode by the intra-screen prediction mode determining unit 11, and groups the macro blocks (MB; Macro Block) using this activity. That is to say, assuming a case where NumOfActivityGroup is grouped, the activity computing unit 16 compares ActivityTheshold[0] through ActivityTheshold[NumOfActivityGroup-2] and the value of activity, thereby determining an activity group.

Note that a quantization parameter QP actually used for quantizing processing is obtained by adding an offset (AdaptQPDelta) depending on the activity group to the average quantization parameter QP (BaseQP) of a picture.

MB_QP=BaseQP+AdaptQPDelta[activity_group]

For example, if we say that NumOfActivityGroup is 13, each value of AdaptQPDelta may be set as follows.

AdaptQPDelta[13]={-6, -5, -4, -3, -2, -1, 0, 1, 2, 3, 4, 5, 6}

The number of the activity group (Activity Group) determined as to each MB is input to the quantizing unit 14. The quantizing unit 14 calculates adaptive quantization parameters QPt by adding the offset according to the activity group to the selected quantization parameters QP1. The quantizing unit 14 executes quantization processing as to the DCT coefficients based on the adaptive quantization parameters QPt.

The first pre-encoding unit 1 sets the next quantization matrix Q Matrix and the selected quantization parameter QP1 corresponding to this quantization matrix Q Matrix, thereby calculating generated code quantity in the same way. As a result thereof, the first pre-encoding unit 1 calculates a generated code quantity regarding each of the quantization matrix Q Matrix and the selected quantization parameter QP1 corresponding to this quantization matrix Q Matrix.

[1-2-2. Error Correction of Generated Code Quantity]

The code quantity unit 4 executes correction as to the generated code quantity calculated at the first pre-encoding unit 1.

Correction mentioned here is executed by taking advantage of this error having some degree of tendency.

A first error factor is due to that the input image 91 is used with the intra-screen prediction processing instead of a local decode (Local Decode) screen. In this case, distortion due to codec (Codec) does not occur on the screen used for intra-screen prediction, and accordingly, there is a tendency wherein encoding efficiency is superior to encoding efficiency of actual encoding, and a code quantity is generated less. The size of this error depends on the size of distortion, and accordingly, there is a tendency wherein with the relationship between the generated code quantity and the error, the smaller the bit rate (Bit rate) is, the greater the error is. Also, with the relationship between the quantization parameter QP and the error, there is a tendency wherein the greater the quantization parameter QP is, the greater the error is. Accordingly, statistical data having the size of the error is prepared beforehand, and is defined as a function between a bit rate "r" and QP "q".

Specifically, the code quantity control unit 4 creates each of an average error model according to a bit rate, and an average error model according to the quantization parameter QP beforehand regarding the generated code quantity when executing encoding using CAVLC. This error model is stored beforehand, for example, as a numerical expression or table corresponding to each of the quantization parameter QP and the bit rate. The code quantity control unit 4 calculates correction quantities C_rate and C_qp representing error to be corrected from the quantization parameter QP and bit rate based on the corresponding error models, respectively. The code quantity control unit 4 selects a smaller value as a correction quantity Cv in accordance with the following expression of the correction quantities C_rate and C_qp corresponding to the quantization parameter QP and bit rage.

Correction quantity $Cv = \min(C\_rate, C\_qp)$

Thus, the correction quantity of the error increases excessively, and accordingly, the corrected generated code quantity is prevented from increasing as compared to a high-precision generated code quantity to be calculated at the second pre-encoding unit 2. Note that the correction quantities C_rate and C_qp represent the percentage (%) as to the generated code quantity (Pre-Encode code quantity) calculated by the first pre-encoding unit 1.

The code quantity control unit 4 multiplies the generated code quantity calculated at the first pre-encoding unit 1 by the correction quantity Cv in accordance with the following expression, thereby calculating a correction quantity as to the generated code quantity (hereafter, referred to as "CAVLC correction code quantity").

CAVLC correction code quantity=Pre-Encode code quantity×$Cv$

The code quantity control unit 4 adds the CAVLC correction code quantity to the generated code quantity, thereby calculating a low-precision generated code quantity regarding CAVLC.

A second error factor is a factor wherein error occurs only when selecting CABAC as the entropy encoding method. The first pre-encoding unit 1 predicts a low-precision generated code quantity when executing encoding using CABAC from the code quantity of CAVLC without executing encoding by CABAC. CABAC is superior to CAVLC regarding encoding efficiency, and accordingly, there is a tendency wherein the generated code quantity pre-encoded by CAVLC occurs much as compared to the actual code quantity. For example, with regard to the relationship between the generated code quantity and the error, when viewing the size of this error statistically, there is a tendency wherein the smaller the bit rate is, the greater the size of the error is due to improvement in CABAC efficiency. This is similarly corrected by taking the statistical data of the size of the error and creating an average error model beforehand.

It has been found that the error due to CABAC changes on the opposite side regarding the quantization parameter QP and bit rate, and the change quantity is small, as compared to error caused with encoding according to the code quantity of CAVLC.

Therefore, the correction quantity regarding CABAC (hereafter, referred to as CABAC correction quantity) is defined as a function between a bit rate "r" and QP "q". At this time, the correction quantity Cb is calculated with the following expression.

Correction quantity $Cb=\min(r, q)$

The code quantity control unit 4 multiplies the generated code quantity (Pre-Encode code quantity) calculated at the first pre-encoding unit 1 by the correction quantity Cv in accordance with the following expression, thereby calculating a correction quantity as to the generated code quantity (hereafter, referred to as "CABAC correction code quantity").

CABAC correction code quantity=Pre-Encode code quantity×$Cb$

The code quantity control unit 4 adds the CABAC correction code quantity to a low-precision generated code quantity, thereby calculating a low-precision generated code quantity regarding CABAC. The code quantity control unit 4 can calculate, such as shown in FIG. 2, each of a CAVLC correction quantity and a CABAC correction quantity (represented with a square) corrected as to the generated code quantity (represented with a black circle) calculated by the first pre-encoding unit 1.

Next, the code quantity control unit 4 executed quantization parameter (QP) estimation processing. As described above, the first pre-encoding unit 1 obtains a generated code quantity by executing pre-encoding using the selected quantization parameter QP1 having a discrete value with an arbitrary interval. The code quantity control unit 4 calculates, of a range of the quantization parameters QP that the quantization matrix Q Matrix can take, a generated code quantity by interpolation regarding the quantization parameters QP other than the selected quantization parameters QP1 (indicated with a white circle). Common interpolation processing may be employed as the interpolation processing, such as linear interpolation or the like.

Figure 2:
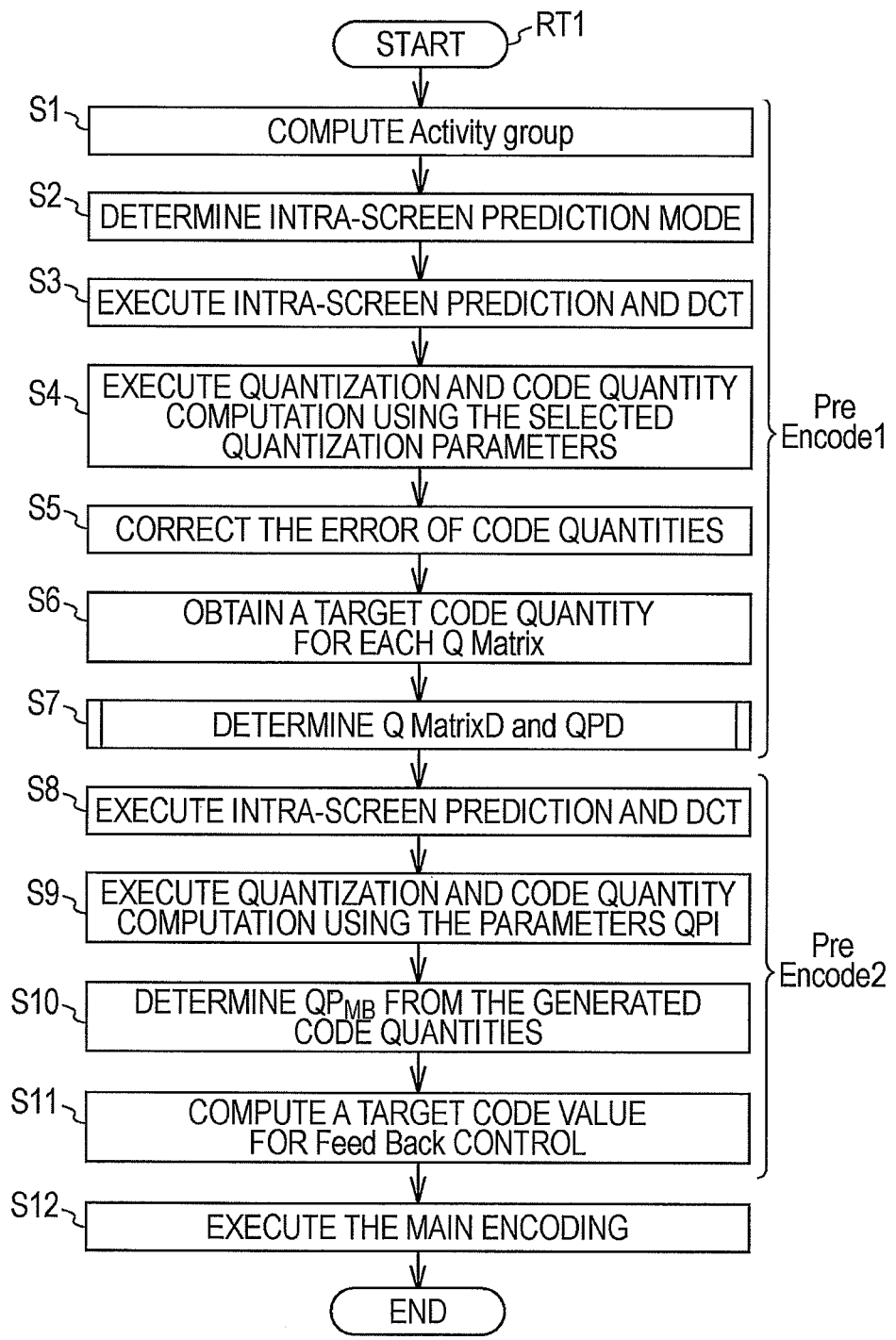
FIG. 2 is a flowchart for describing an encoding processing procedure according to the image encoding device according to the first embodiment of the present invention in detail.

That is to say, such as shown in FIG. 2, correction is executed as to the quantization parameters QP having a discrete value obtained at the first pre-encoding unit 1 (indicated with a square) to obtain quantization parameters after correction (indicated with black circles), and code quantity is calculated by interpolation regarding quantization parameters QP therebetween (indicated with white circles).

Thus, the code quantity control unit 4 calculates a low-precision generated code quantity regarding CAVLC by correcting the error of a generated code quantity generated according to simplified processing at the first pre-encoding unit 1 as to the generated code quantity calculated by the first pre-encoding unit 1. Thus, the code quantity control unit 4 can improve prediction precision of the generated code quantity by the simplified encoding processing. The code quantity control unit 4 uses the low-precision generated code quantity regarding CAVLC to calculate a low-precision generated code quantity that is a predictive quantity of the generated code quantity by CABAC. Thus, the code quantity control unit 4 can estimate the low-precision generated code quantity by CABAC without executing CABAC of which the processing is complicated. The code quantity control unit 4 predicts the low-precision generated code quantity regarding a quantization parameter QP other than the selected quantization parameter QP1 using interpolation processing from the low-precision generated code quantity predicted by the selected quantization parameter QP1 selected discretely. Thus, the code quantity control unit 4 does not have to go to the trouble of encoding the input image 91 using all the quantization parameters QP, whereby the configuration of the first pre-encoding unit 1 can be simplified.

[1-2-3. Determination of Predictive Quantization Matrixes]

As described above, a low-precision generated code quantity is calculated regarding all the quantization parameters QP that the quantization matrix Q Matrix can take. The code quantity control unit 4 changes the quantization matrix Q Matrix according to encoding difficulty, and selects the quantization parameter QP the most approximate to the target code quantity as a basic quantization parameter $QP_{MB}$ based on the low-precision generated code quantity corresponding to the changed quantization matrix Q Matrix.

The code quantity control unit 4 selects the quantization parameter QP used at the time of the low-precision generated code quantity the most approximate to the target code quantity being generated as a proximity quantization parameter QPn for each quantization matrix Q Matrix. The code quantity control unit 4 uses the proximity quantization parameter QPn selected for each quantization matrix Q Matrix as encoding difficulty, for example. It goes without saying that another index such as activity or the like may also be used. Now, let us say that the number of quantization matrixes Q Matrix to be used by switching is taken as NumOfQMatrixId, an Id (Identifier) is appended in ascending order from a quantization matrix Q Matrix having a gentle inclination, and the maximum quantization parameter QP in a range that each quantization matrix Q Matrix can take is taken as QMatrixThreshold[Id].

The code quantity control unit 4 compares the proximity quantization parameter QPn and QMatrixTheshold from a quantization matrix Q Matrix having a small Id value. The code quantity control unit 4 determines, of the quantization matrixes Q Matrix of which the proximity quantization parameter QPn is smaller than QMatrixTheshold[Id], the quantization matrix Q Matrix having the least Id as a predictive quantization matrix Q MatrixD. The code quantity control unit 4 determines the proximity quantization parameter QPn of this predictive quantization matrix Q MatrixD as a predictive quantization parameter QPd.

That is to say, the code quantity control unit 4 determines, of the quantization matrixes Q Matrix that can take the quantization parameter QP of which the low-precision generated code quantity is approximate to the target code quantity, the quantization matrix Q Matrix having the least inclination as a predictive quantization matrix Q MatrixD. This predictive quantization matrix Q MatrixD is also used for the main encoding by the main encoding unit 3. The code quantity control unit 4 can use the quantization matrix Q Matrix having the least inclination of the quantization matrixes Q Matrix that satisfy the conditions for a low-precision generated code quantity, whereby deterioration in image quality can be prevented as much as possible.

Note that the code quantity control unit 4 controls the first pre-encoding unit 1 to calculate, in order from a quantization matrix Q Matrix having a small Id, a low-precision generated code quantity regarding the selected quantization parameters QP1 in a range that this quantization matrix Q Matrix can take. Subsequently, in the case of detecting a quantization matrix Q Matrix of which the proximity quantization parameter QPn is smaller than QMatrixTheshold[Id], the code quantity control unit 4 determines this quantization matrix Q Matrix and the proximity quantization parameter QPn as a predictive quantization matrix Q MatrixD and a predictive quantization parameter QPd. At this time, the code quantity control unit 4 controls the first pre-encoding unit 1 to start processing as to the next picture. That is to say, the code quantity control unit 4 controls the first pre-encoding unit 1 not to calculate a low-precision generated code quantity regarding the quantization matrix Q Matrix made up of the next Id regarding the picture in progress. Thus, the code quantity control unit 4 can reduce processing time necessary for determining a predictive quantization parameter QPd and a predictive quantization matrix Q MatrixD.

Thus, the code quantity control unit 4 selects, of the quantization matrixes Q Matrix of which the low-precision generated code quantity can take the quantization parameter QP approximate to the target code quantity, the quantization matrix Q Matrix having the least inclination to prevent deterioration in image quality as a predictive quantization matrix Q MatrixD. The code quantity control unit 4 selects the quantization parameter QP of which the low-precision generated code quantity is the most approximate to the target code quantity with the predictive quantization matrix Q MatrixD as a predictive quantization parameter QPd. Thus, the code quantity control unit 4 can select the quantization parameter QP of which the low-precision generated code quantity is the most approximate to the target code quantity as a predictive quantization parameter QPd while adaptively changing the quantization matrixes Q Matrix so as not to deteriorate image quality as much as possible.

[1-3. Determination of Basic Quantization Parameter]

The second pre-encoding unit 2 actually executes the same encoding as the encoder 3 using the predictive quantization parameter QPd and the predictive quantization matrix Q MatrixD, thereby calculating a high-precision generated code quantity with high precision. Hereafter, the generated code quantity calculated by the second pre-encoding unit 2 will be referred to as a high-precision generated code quantity. At this time, the second pre-encoding unit 2 calculates a high-precision generated code quantity using not only the predictive quantization parameter QPd but also the quantization parameters QP before and after this predictive quantization parameter QPd, and predicts a high-precision generated code quantity approximate to the predictive quantization parameter QPd using a rate of fluctuation thereof.

The code quantity control unit 4 supplies the predictive quantization parameter QPd, the predictive quantization matrix Q MatrixD, and the activity group of each MB to the second pre-encoding unit 2. The second pre-encoding unit 2 executes second pre-encoding based on these values.

With the second pre-encoding unit 2, the input image 91 is input to the intra-screen prediction processing unit 21 after being subjected to delay processing via a delay buffer 5. The intra-screen prediction processing unit 21 computes difference between a predictive image and the input image 91 to generate difference image data. Subsequently, the DCT unit 22 executes DCT processing as to the difference image data to generate DCT coefficients. The quantizing unit 23 executes quantization processing as to the DCT coefficients to generate quantization coefficients. The entropy code length computing unit 24 subjects the quantization coefficients to entropy encoding using CAVLC or CABAC, and computes high-precision generated code quantity.

Note that with the process of the processing at the second pre-encoding unit 2, the quantizing unit 23 transmits the quantization coefficients to the inverse quantizing unit 27. The inverse quantizing unit 27 subjects the quantization coefficients to inverse quantization to reproduce the DCT coefficients. Subsequently, the IDCT unit 26 subjects the DCT coefficients to IDCT transform to generate a local decode image, and stores this in the buffer 25.

Here, the quantizing unit 23 is configured of three steps of quantizing units 23-1, 23-2, and 23-3 with this example, and the entropy code length computing unit 24 is configured of three steps of entropy code length computing units 24-1, 24-2, and 24-3. The reason why the number of steps is reduced to three is because the quantization parameter QP has already been estimated roughly with a wide range at the first pre-encoding.

Under such an arrangement, the quantizing unit 23 and the entropy code length computing unit 24 execute processing in parallel to obtain high-precision generated code quantity with the predictive quantization parameter QPd and the quantization parameters QP before and after this predictive quantization parameter QPd. At this time, the entropy code length computing unit 24 selects the same method as the entropy encoding method of the main encoding by the main encoding unit 3 from one of CABAC and CAVLC.

Subsequently, the code quantity control unit 4 determines a basic quantization parameter $QP_{MB}$ of a picture to be used for the main encoding from the high-precision generated code quantity obtained at the second pre-encoding. Subsequently, the code quantity control unit 4 transmits quantization information (Q Matrix, QP of each MB, etc.) from the determined picture basic quantization parameter $QP_{MB}$, the predictive quantization matrix Q Matrix D, and the activity group of each MB to the main encoding unit 3.

More specifically, in the case that the target code quantity is sandwiched with high-precision generated code quantity obtained at the second pre-encoding, i.e., Generated_bits($QP$_precode1+1)
<=Target_bits<=Generated_bits($QP$_precode1−1), the quantization parameter QP the most approximate to the target code quantity is selected as a basic quantization parameter $QP_{MB}$.

Otherwise, the code quantity control unit 4 obtains a rate of fluctuation of high-precision generated code quantity as to change in the quantization parameter QP from the second pre-encoding. The predictive quantization parameter QPd is calculated based on the low-precision generated code quantity by the first pre-encoding unit 1. Therefore, the quantization parameter QP the most approximate to the target code quantity exists near the predictive quantization parameter QPd. In the case that the value of the quantization parameter QP is approximate to the target code quantity, the rate of fluctuation of the generated code quantity is generally constant. Therefore, the code quantity control unit 4 predicts the high-precision generated code quantity of each quantization parameter QP from the rate of fluctuation of the high-precision generated code quantity with the predictive quantization parameter QPd, and the quantization parameters QP before and after this predictive quantization parameter QPd, and selects the quantization parameter QP the most approximate to the target code quantity as a basic quantization parameter $QP_{MB}$.

First, when "1" is subtracted from the quantization parameter QP, DiffRatio__1 representing how much percentage the high-precision generated code quantity changes is obtained from the results of the second pre-encoding unit 2 as follows. Note that Generated_bits represents the generated code quantity at the second pre-encoding unit 2, QP_precode1 represents the predictive quantization parameter QPd, and QP_precode1−1 represents the quantization parameter QP that is smaller than the predictive quantization parameter QPd by 1.

DiffRatio__1=(Generated_bits(QP_precode1−1)−Generated_bits($QP$_precode1))/Generated_bits (QP_precode1)

When "1" is added to the quantization parameter QP, DiffRatio__2 representing how much percentage the high-precision generated code quantity changes is obtained from the results of the second pre-encoding unit 2 as follows. QP_precode1+1 represents the quantization parameter QP that is greater than the predictive quantization parameter QPd by 1.

DiffRatio__2=(Generated_bits($QP$_precode1)−Generated_bits($QP$_precode1+1))/Generated_bits ($QP$_precode1+1)

The rate of fluctuation of the high-precision generated code quantity approximate to the predictive quantization parameter QPd is obtained as follows.

DiffRatio=(DiffRatio__1+DiffRatio__2)/2

That is to say, DiffRatio is calculated as an average value of fluctuation of a generated code quantity when the generated code quantity changes in the positive/negative direction from the predictive quantization parameter QPd by "1".

If we say that DeltaQP is taken as the absolute value of difference between the quantization parameter QP of which the high-precision generated code quantity is the most approximate to the target code quantity and the predictive quantization parameter QPd (QP_precode1), when the quantization parameter QP corresponding to the high-precision generated code quantity the most approximate to the target code quantity is smaller than the quantization parameter QP (QP_precode1−1) that is smaller than the predictive quantization parameter QPd by 1, the high-precision generated code quantity (Generated_bits(QP)) of the quantization parameter QP of which the high-precision generated quantity is the most approximate to the target code quantity is calculated as follows.

Generated bits($QP$)=Generated_bits($QP$_precode1−1)×(1.0+DiffRatio)^(Delta$Qp$−1)

When the quantization parameter QP corresponding to the high-precision generated code quantity the most approximate to the target code quantity is greater than the quantization parameter QP (QP_precode1+1) that is greater than the predictive quantization parameter QPd by 1, the high-precision generated code quantity (Generated_bits(QP)) of the quantization parameter QP of which the high-precision generated quantity is the most approximate to the target code quantity is calculated as follows.

Generated_bits ($QP$)=Generated_bits(QP_precode1+1)×(1.0−DiffRatio)^(Delta$Qp$−1)

That is to say, the code quantity control unit 4 increases or decreases the high-precision generated code quantity at the time of using the quantization parameters QP before and after the predictive quantization parameter QPd by the code quantity according to the rate of fluctuation at the time of the value of the quantization parameter QP changing by "1" with the predictive quantization parameter QPd as the center. The code quantity control unit 4 can calculate a high-precision generated code quantity in the case of using the quantization parameters QP approximate to the predictive quantization parameter QPd, with high precision.

As described above, the code quantity control unit 4 selects the quantization parameter QP the most approximate to the target code quantity as a basic quantization parameter $QP_{MB}$ used as an average quantization parameter (BaseQP) with the main encoding.

As described above, the second pre-encoding unit 2 executes pre-encoding with the predictive quantization parameter QPd (QP_precode1) estimated by the first pre-encoding unit 1, the quantization parameter QP (QP_precode1+1) greater than that by 1, and the quantization parameter QP (QP_precode1−1) smaller than that by 1. Here, in order to reduce the circuit scale, as described above, only the quantizing unit 23 and the entropy code length computing unit 24 are parallelized, and other processing is shared.

At this time, let us say that a local decode (Local Decode) image used at the intra-screen prediction processing is data quantized with the predictive quantization parameter QPd (QP_precode1) estimated based on the results of the first pre-encoding unit 1. That is to say, data to be subjected to inverse quantization and IDCT is the quantization output of the predictive quantization parameter QPd (QP_precode1). This means that not the local decode (Local Decode) screen of itself but the local decode (Local Decode) screen of the predictive quantization parameter QPd (QP_precode1) is substituted for the input of the intra-screen prediction processing of pre-encoding using the quantization parameters QP (QP_precode1+1, QP_precode1−1) before and after the predictive quantization parameter QPd.

Thus, the code quantity control unit 4 calculates a high-precision generated code quantity with the same encoding as the main encoding according to the predictive quantization parameter QPd regarding which there is a possibility that the low-precision generated code quantity may be the most approximate to the target code quantity, and the quantization parameters QP therebefore and thereafter, according to the prediction of the low-precision generated code quantity based on the results of the first pre-encoding unit 1. Thus, the code quantity control unit 4 can calculate a high-precision generated code quantity in the case of using the predictive quantization parameter QPd and the quantization parameters QP therebefore and thereafter generally in an accurate manner. Further, with the present invention, it has been noted that the rate of fluctuation of a high-precision generated code quantity accompanied with change in the quantization parameter QP is generally constant within a narrow range. The code quantity control unit 4 calculates a high-precision generated code quantity at the time of using the quantization parameters QP approximate to the predictive quantization parameter based on the rate of fluctuation of a high-precision generated code quantity with the predictive quantization parameter QPd and the quantization parameters QP therebefore and thereafter. Thus, the code quantity control unit 4 can also calculate a high-precision generated code quantity generally in an accurate manner regarding the quantization parameters QP approximate to the predictive quantization parameter QPd.

[1-4. Main Encoding]

The main encoding unit 3 executes the main encoding using the basic quantization parameter $QP_{MB}$ obtained based on the results of the second pre-encoding unit 2, and the predictive quantization matrix Q Matrix, activity groups, and intra-screen prediction mode based on the results of the first pre-encoding unit 1, and the like. Specifically, with the main encoding unit 3, upon receiving the input image 91 subjected to delay processing via the delay buffer 6, the intra-screen prediction processing unit 31 calculates difference image data between a predictive image and the input image 91 with the intra-screen prediction mode determined at the time of the first pre-encoding. The DCT unit 32 executes DCT processing, and the quantizing unit 33 executes quantization of a DCT coefficient. The output of the quantizing unit 33 (quantization coefficient) is also transmitted to the inverse quantizing unit 37. The inverse quantizing unit 37 subjects the quantization coefficient to inverse quantization to reproduce the DCT coefficient. Subsequently, the IDCT unit 36 subjects the DCT coefficient to IDCT transform to generate a predictive image, and stores this in the buffer 35.

Thus, entropy encoding is executed by the entropy encoding unit 34 passing through DCT by the DCT unit 32, and quantization of the DCT coefficient by the quantizing unit 33, and an output stream 92 serving as the target code quantity is output.

[1-5. Conclusion]

Thus, the image encoding device 100 according to the present embodiment computes, with the first pre-encoding by the first pre-encoding unit 1, low-precision generated code quantity at the time of executing encoding with the multiple selected quantizing parameters QP1, thereby estimating a predictive quantization parameter QPd serving as the target code quantity.

At this time, in order to compute a generated code quantity in the case of executing encoding using the selected quantization parameter QP1 with an arbitrary interval, the first pre-encoding unit 1 executes encoding in parallel.

In general, in order to execute encoding in parallel, the circuit scale extremely increases, but with the present embodiment, the problem is eliminated processing is executed in a shared manner as much as possible while realizing parallel encoding to reduce the circuit scale.

That is to say, more specifically, with the first pre-encoding unit 1, as described above, only the quantizing unit 14 and the entropy code length computing unit 15 are parallelized, and other processing is shared. Also, in order to reduce an inverse quantizing unit, IDCT unit, and buffer, the intra-screen prediction processing is executed using an input image serving as a predictive image.

On the other hand, in the case of using CABAC as entropy encoding, the processing is not readily executed with a high bit rate. That is to say, in the case of tentatively using CABAC as entropy encoding, when executing code quantity computation with a certain quantization parameter QP for code quantity prediction, in the case that the code quantity with the quantization parameter QP thereof is great (i.e., in the case that each value of quantization coefficients is great), the generated code quantity is not readily predicted.

CABAC is an entropy encoding method wherein a probability calculation is executed for each bit, thereby compressing data. Processing for each bit means that the longer the code quantity is, the longer the processing time is, and accordingly, the processing does not end within a certain period of time (e.g., time of one frame). Therefore, in the case of tentatively using CABAC as entropy encoding, and in the case that the code quantity is great, the first pre-encoding unit 1 has difficulty in computing a generated code quantity after entropy encoding, and has difficulty in predicting a generated code quantity with a high bit rate.

From this point of view, with the first embodiment, the first pre-encoding unit 1 uses CAVLC with a code quantity calculation. Thus, with the first pre-encoding unit 1, the circuit scale is reduced, the processing is reduced, and simplified pre-encoding is executed, thereby roughly estimating a low-precision generated code quantity. Subsequently, the code quantity control unit 4 selects the quantization parameter QP having a low-precision generated code quantity approximate to the target code quantity as a predictive quantization parameter QPd.

The second pre-encoding unit 2 takes into consideration that estimation of the predictive quantizing parameter QPd by the first pre-encoding unit 1 includes error, and executes pre-encoding again, thereby improving the precision of quantization parameter QP estimation. Specifically, pre-encoding is executed again with the quantization parameters QP surrounding the predictive quantization parameter QPd estimated roughly by the first pre-encoding unit 1, thereby obtaining a high-precision generated code quantity, and obtaining the quantization parameter QP the most approximate to a high-precision generated code quantity serving as a target again. With the entropy code length computation, the same method as the main encoding (CABAC or CAVLC) is used.

Note that there is error due to the input of the intra-screen prediction processing (local decode image) differing, but the quantization parameter QP has generally the same value, and distortion due to encoding is generally the same quantity, and accordingly, this is negligible.

[1-6. Processing Procedure]

Figure 3:
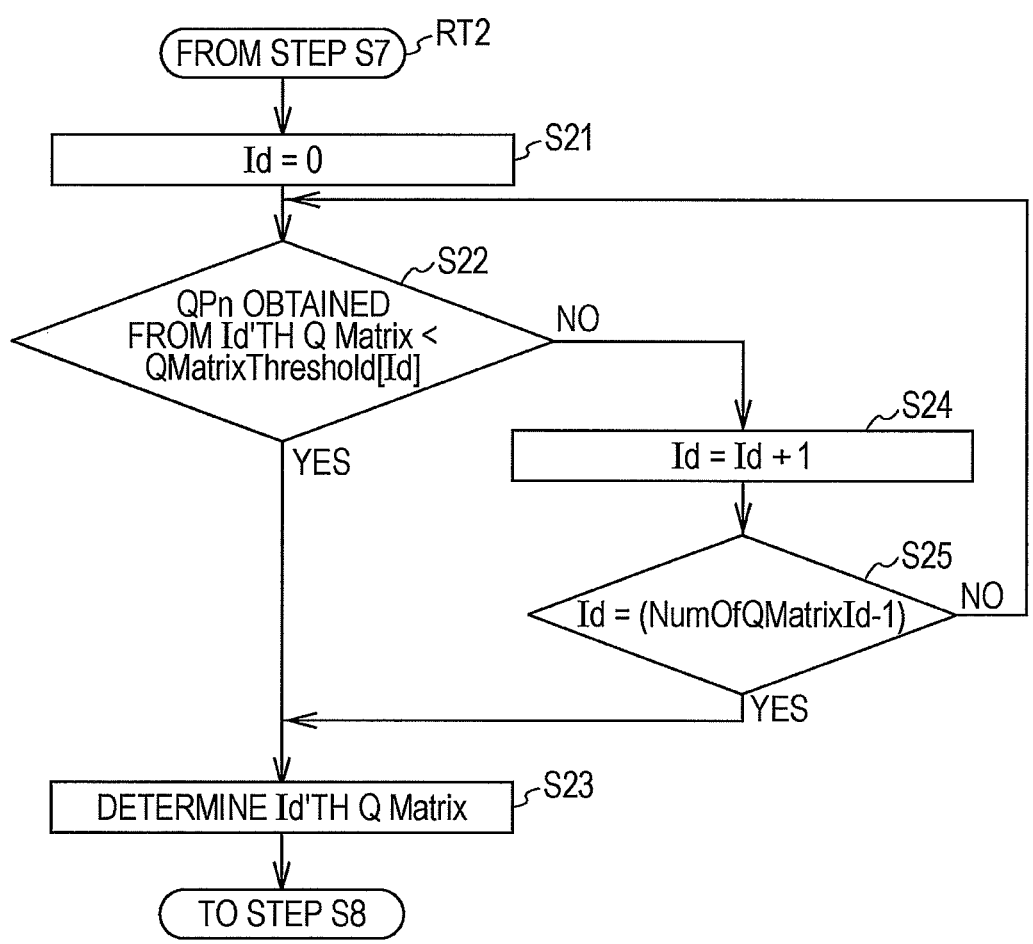
FIG. 3 is a flowchart for further describing adaptive Q Matrix switching processing.

An encoding processing procedure RT1 according to the image encoding device 100 according to an embodiment of the present invention will be described below in detail with reference to the flowchart in FIG. 3. A portion or all of this processing procedure is also equivalent to an image encoding method according to an embodiment.

First, the activity computing unit 16 computes activity for each MB, and divides the MB into active groups according to the value thereof (step S1).

Subsequently, the intra-screen prediction mode determining unit 11 determines the intra-screen prediction mode based on the input image 91 (step S2). This intra-screen prediction mode is also used for the second pre-encoding by the second pre-encoding unit 2 and the main encoding by the main encoding unit 3.

Next, the intra-screen prediction processing unit 12 computes difference image data between a predictive image and an input image. The input image 91 is used as the predictive image mentioned here to reduce the processing. Next, the DCT unit 13 executes integer precision DCT to transmit DCT coefficients to the quantizing unit 14 (step S3).

The quantizing unit 14 quantizes the DCT coefficient values with multiple selected quantization parameters QP1 having an arbitrary interval as an average quantization parameter (BaseQP) of a picture. The entropy code length computing unit 15 subjects the quantization coefficients to variable length encoding, and executes code length computation, thereby obtaining the generated code quantity for each selected quantization parameter QP1 (step S4). At this time, the quantization parameter QP of an MB is provided with a value in which activity is taken into consideration as described above, and is encoded. That is to say, as described above, the quantization parameter QP of an MB is obtained by adding an offset depending on an activity group to the average quantization parameter (BaseQP) of a picture.

Note that in the case of handling adaptive quantization matrix Q Matrix switching processing, the above processing is executed for each quantization, matrix Q Matrix. Specifically, pre-encoding is executed with the selected quantization parameters QP1 having a discrete (skipped) value to obtain one picture worth of generated code quantity for each quantization matrix Q Matrix. At this time, the selected quantization parameters QP1 are selected so as to cover a range that the quantization parameters QP can take for each quantization matrix Q Matrix.

Next, the code quantity control unit 4 executes the correction processing of the generated code quantity calculated by the first pre-encoding unit 1 to calculate a low-precision generated code quantity. The code quantity control unit 4 executes correction of error due to simplification of pre-encoding, and also calculates the low-precision generated code quantity corresponding to a quantization parameter QP other than the selected quantization parameters QP1 by interpolation processing (step S5).

The code quantity control unit 4 executes the processing in step S5 as to each quantization matrix Q Matrix to calculate a low-precision generated code quantity for each quantization matrix Q Matrix (step S6). With the above processing, the low-precision generated code quantity corresponding to all necessary quantization parameters QP are obtained, and accordingly, of the quantization parameters QP whereby the low-precision generated code quantity the most approximate to the target code quantity can be generated thereof, the quantization matrix Q Matrix having the least inclination is selected as a predictive quantization matrix Q MatrixD. Further, the code quantity control unit 4 selects the quantization parameter QP that can generate a low-precision generated code quantity the most approximate to the target code quantity corresponding to the predictive quantization matrix Q MatrixD as a predictive quantization parameter QPd (step S7). Also, selecting the quantization matrix Q Matrix as described above restricts the range of available quantization parameters QP, and accordingly, the range of the selected quantization parameter QP1 at the time of the first pre-encoding unit 1 calculating a low-precision generated code quantity can be reduced. This will become the predictive quantization matrix Q MatrixD and the predictive quantization parameter QPd determined at the first pre-encoding unit 1.

Subsequently, the code quantity control unit 4 executes generated code quantity obtaining processing by the second pre-encoding unit 2 (steps S8 through S10). The purpose of this second pre-encoding unit 2 is to improve the estimation precision of the basic quantization parameter $QP_{MB}$ by executing pre-encoding again while taking into consideration that estimation of the predictive quantization parameter QPd by the first pre-encoding unit 2 includes error.

Specifically, pre-encoding is executed again with the quantization parameters QP surrounding the predictive quantization parameter QPd estimated roughly according to the results of the first pre-encoding unit 1, thereby obtaining a high-precision generated code quantity, and obtaining the quantization parameter QP the most approximate to the target code quantity again. With the entropy code length computation, the same method as the main encoding (CABAC or CAVLC) is used.

Specifically, the code quantity control unit 4 executes the intra-screen prediction processing by the intra-screen prediction processing unit 21, and DCT by the DCT unit 22 using the intra-screen prediction mode determined with the results of the first pre-encoding unit 1 (step S8). The second pre-encoding unit 2 shares the local decode image quantized with the predictive quantization parameter QPd (QP_precode1) estimated with the results of the first pre-encoding unit 1 as a local decode image (predictive image) used for intra-screen prediction.

At the time of quantization, the predictive quantization parameter QPd (QP_precode1) determined with the results of the first pre-encoding unit 1, the quantization matrix Q Matrix, and the activity groups (Activity Group) are used. The predictive quantization parameter QPd (QP_precode1) is set to the quantizing unit 23-1, the quantization parameter QP smaller than the predictive quantization parameter QPd by "1" (QP_precode1−1) is set to the quantizing unit 23-2, and the quantization parameter QP greater than the predictive quantization parameter QPd by "1" (QP_precode1+1) is set to the quantizing unit 23-3.

Further, the quantization parameter (QP) of an MB is provided with a value in which activity is taken into consideration, and is encoded. According to the following second pre-encoding, the high-precision generated code quantity of one picture can be obtained (step S9).

Subsequently, the code quantity control unit 4 determines a basic quantization parameter $QP_{MB}$ from the high-precision generated code quantity obtained based on the second pre-encoding unit 2 (step S10).

Subsequently, the main encoding unit 3 executes the main encoding (step S11). With the main encoding, encoding is executed using the basic quantization parameter $QP_{MB}$ of a picture determined with the results of the second pre-encoding unit 2, the predictive quantization matrix Q MatrixD determined with the results of the first pre-encoding unit 1, and Activity Group. Thus, a series of processing relating to encoding ends.

A Q Matrix determining processing procedure RT2 to be executed in step S7 in the encoding processing procedure RT1 according to the image encoding device 100 will be further described below with reference to the flowchart in FIG. 4.

Upon starting this processing, the code quantity control unit 4 first initializes Id to Id=0 (step S21), and then compares the quantization parameter (QP) of which the low-precision generated code quantity is the most approximate to the target code quantity from the quantization matrix Q-Matrix having the least Id value, and the maximum quantization parameter QP that can be obtained with the quantization matrix Q-Matrix (QMatrixTheshold[Id]) (step S22). Subsequently, in the case that the quantization parameter (QP) of which the low-precision generated code quantity is the most approximate to the target code quantity with the Id'th quantization matrix Q-Matrix is smaller than QMatrixTheshold[Id], the code quantity control unit 4 determines the current quantization matrix Q-Matrix as a predictive quantization matrix Q MatrixD. Further, upon determining the quantization parameter (QP) of which the low-precision generated code quantity is the most approximate to the target code quantity with the predictive quantization matrix Q MatrixD as a predictive quantization parameter QPd (step S23), the code quantity control unit 4 ends the Q Matrix determining processing procedure RT2.

On the other hand, in step S22, in the case that the quantization parameter (QP) of which the low-precision generated code quantity is the most approximate to the target code quantity with the Id'th quantization matrix Q-Matrix is equal to or greater than QMatrixTheshold[Id], the code quantity control unit 4 increments Id (step S24). The code quantity control unit 4 determines whether or not Id is smaller than the total number of quantization matrixes Q-Matrix by "1" (NumOfQMatrixId−1) (step S25). Subsequently, in the case that Id=NumOfQMatrixId−1 does not hold, the code quantity control unit 4 returns to step S22, and checks the next quantization matrix Q-Matrix. On the other hand, in the case that Id=NumOfQMatrixId−1, the code quantity control unit 4 selects the quantization matrix Q-Matrix having the steepest inclination (quantization matrix Q-Matrix of which ID is NumOfQMatrixId) (step S23), and ends the Q Matrix determining processing procedure RT2.

Figure 4:
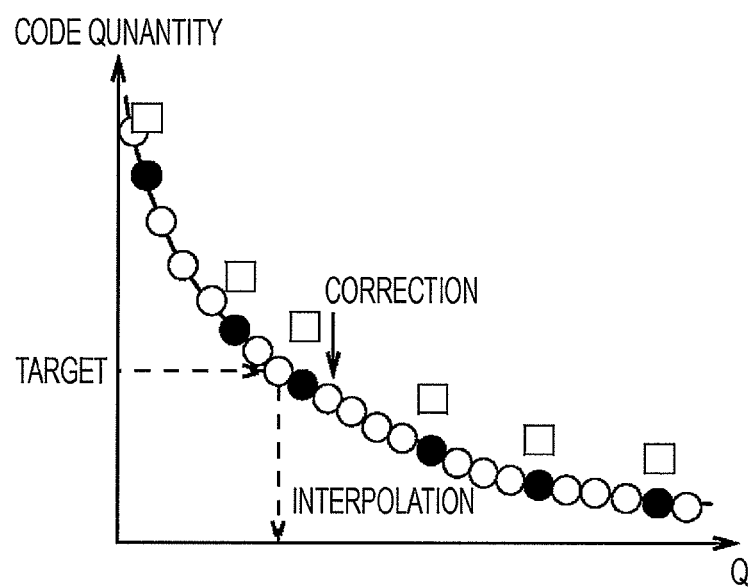
FIG. 4 is a conceptual diagram for describing that correction of QPs having a discrete value is executed, and a code quantity is computed with interpolation regarding QPs therebetween.

According to the Q Matrix determining processing procedure RT2 in FIG. 4, the code quantity control unit 4 sets the available maximum quantization parameter QP for each quantization matrix Q-Matrix, and determines in order from a quantization matrix Q-Matrix having a moderate inclination whether or not the low-precision generated code quantity corresponding to the quantization parameter QP of which the low-precision generated code quantity has been estimated to be the most approximate to the target code quantity actually indicates a value approximate to the target code quantity. Subsequently, in the case of indicating a value approximate to the target code quantity, the code quantity control unit 4 determines the corresponding quantization matrix Q-Matrix to be a predictive quantization matrix Q MatrixD used for the main encoding.

As described above, with an embodiment of the present invention, two encodes in increments of pictures are carried out. In order to improve efficiency, the image encoding device 100 increases the processing volume, and in order to solve a problem wherein the circuit scale of encoding increases due thereto, a partial parallel configuration according to circuit partial sharing is employed. Thus, while simplifying the configuration of the pre-encoder, error accompanied with this simplification is corrected with statistical data.

Accordingly, the image encoding device 100 can add a main encoding generated code quantity that occurs with the main encoding to the target code quantity provided to one picture without executing intra-screen feedback control. Thus, the image encoding device 100 can eliminate feedback control problems, such as harmful effects due to an inappropriate initial value of a feedback parameter, inappropriate target code quantity distribution, or the like. As a result thereof, the image encoding device 100 can determine code quantity distribution wherein the main encoding generated code quantity is matched with the target code quantity, and visual features are taken into consideration, i.e., an appropriate quantization parameter.

Note that the present invention is not restricted to the above embodiment, and various modifications and changes can be made without departing from the essence of the present invention.

For example, the image encoding device 100 and image encoding method may be carried out as a computer program installed in this device, a recording medium in which this program is recorded, a computer program for carrying out this method, or a recording medium in which this program is recorded.

[1-7. Operation and Advantage]

According to the above arrangement, the image encoding device 100 serving as an image processing device encodes the input image 91 by quantizing at least the input image 91 that is an input image based on the DCT coefficients that are simplified encoded data obtained by encoding the input image 91 with simple processing, and the selected quantization parameters QP1 discretely selected from the quantization parameters QP that are quantizing factors, and calculates the generated code quantity of the encoded input image 91.

The image encoding device 100 corrects error caused according to simple processing with the generated code quantity of an encoded input image, and calculates low-precision generated code quantity.

The image encoding device 100 calculates a low-precision generated code quantity at the time of the input image 91 being encoded based on a quantization parameter QP other than the selected quantization parameter QP1, by interpolation processing as to a low-precision generated code quantity at the time of the input image 91 being encoded based on the selected quantization parameter QP1.

Thus, the image encoding device 100 can calculate, without encoding all the quantization parameters QP, low-precision generated code quantity based on all the quantization parameters QP, whereby calculation of low-precision generated code quantity can be simplified, and also the calculation circuit can be reduced.

The image encoding device 100 determines a quantization parameter QP of which the main encoding generated code quantity is predicted to be the most appropriate to the target code quantity when encoding the input image 91, based on the low-precision generated code quantity calculated encoding and interpolation processing based on the selected quantization parameter QP1, as a basic quantization parameter $QP_{MB}$. The image encoding device 100 encodes (main-encodes) the input image 91 based on the basic quantization parameter $QP_{MB}$ using the main encoding unit 3.

Thus, the image encoding device 100 can determine a basic quantization parameter $QP_{MB}$ based on the low-precision generated code quantity generated by simple processing, whereby processing for determining a basic quantization parameter $QP_{MB}$ can be simplified.

<2. Second Embodiment>

Figure 5:
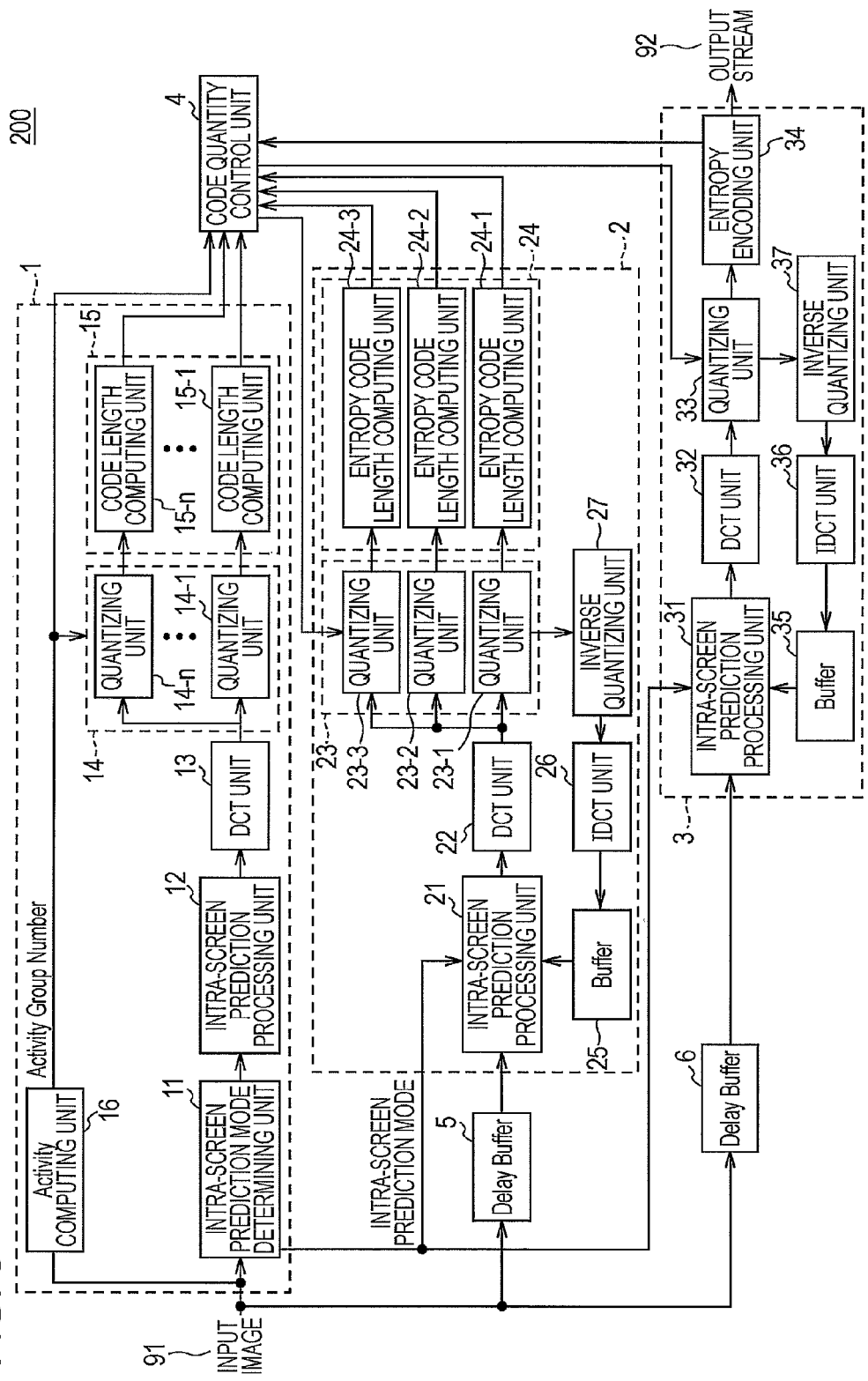
FIG. 5 is a configuration diagram of an image encoding device according to a second embodiment of the present invention.
Figure 6:
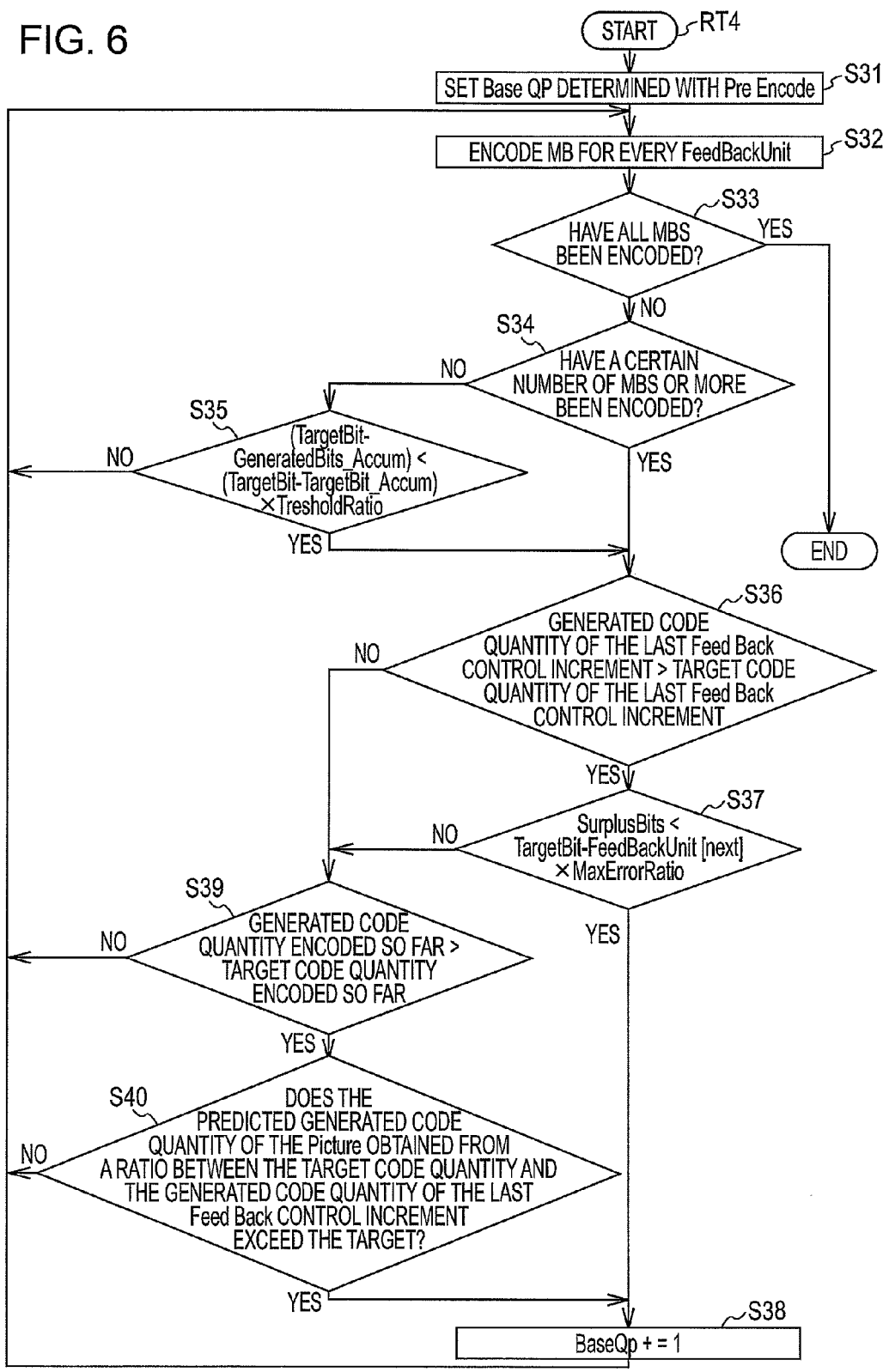
FIG. 6 is a flowchart for describing, with regard to basic QP determining processing with feedback control, the processing procedure thereof.

A second embodiment shown in FIG. 5 through FIG. 6, such as shown in the portions corresponding to the first embodiment shown in FIG. 1 through FIG. 4 being denoted with the same reference numerals, differs from the first embodiment in that the main encoding unit 3 according to an image encoding device 200 executes feedback control according to the main encoding generated code quantity actually generated.

[2-1. Feedback Control with the Main Encoding]

The image encoding device 200 executes, in the same way as with the first embodiment, the main encoding by feed forward control using the basic quantization parameter $QP_{MB}$ of which the main encoding generated code quantity is predicted to be the most appropriate to the target code quantity. Therefore, the image encoding device 200 can suppress the main encoding generated code quantity to the target code quantity. However, on rare occasions, the image encoding device 200 fails in calculation of a high-precision generated code quantity, and consequently selects an inappropriate basic quantization parameter $QP_{MB}$. Therefore, in order to handle such a case, the image encoding device 200 suppresses the encoding generated code quantity to the target code quantity in a sure manner by feedback control of the main encoding generated code quantity. Note that, with the second embodiment, the code quantity control unit 4 determines, for example, the quantization parameter QP of which the high-precision generated code quantity does not exceed the target code quantity, and is also the most approximate to the target code quantity, as a basic quantization parameter $QP_{MB}$. Thus, the code quantity control unit 4 determines a basic quantization parameter $QP_{MB}$ so that the main encoding generated code quantity may become somewhat smaller than the target code quantity.

Such as shown in FIG. 5, the image encoding device 200 puts the following processing into effect to realize an excellent code quantity distribution within a picture at the time of executing code quantity control in accordance with an image compression method represented with H.264/AVC (Advanced Video Coding; advanced moving image compression coding standard) or the like, and also to realize picture fixed length coding.

With the main encoding of 3 pass encoding, the image encoding device 200 executes rate control according to intra-screen feedback (Feed Back) to suppress a code quantity to a certain value or less.

In order to suppress the unnecessary fluctuation of the quantization parameter QP due to feedback control, in the case that the generated code quantity for each picture is predicted not to exceed the target code, the image encoding device 200 changes the quantization parameter QP to be used (usage quantizing factor) from the basic quantization parameter $QP_{MB}$ using visual features (activity) alone. That is to say, the image encoding device 200 takes an adaptive quantization parameter QPt with the basic quantization parameter $QP_{MB}$ as an average picture BaseQP as a quantization parameter QP to be used.

In the case that the main encoding generated code quantity is predicted to exceed the target code due to feedback control, the image encoding device 200 changes the average quantization parameter BaseQP from the basic quantization parameter $QP_{MB}$. At this time, in order to suppress unnecessary fluctuation of the average quantization parameter BaseQP, the image encoding device 200 changes the average quantization parameter BaseQP only in a direction where the quantization parameter QP becomes great (i.e., only in a direction where the generated code quantity becomes small). As a result thereof, the image encoding device 200 takes the adaptive quantization parameter QPt based on the changed average quantization parameter BaseQP as a quantization parameter QP to be used. Note that the average quantization parameter BaseQP once changed in a greater direction never returns to the direction of becoming smaller.

Specifically, the main encoding unit 3 of the image encoding device 200 executes encoding using the quantization matrix Q Matrix, and Activity Group determined by the first pre-encoding unit 1 with the basic quantization parameter $QP_{MB}$ determined based on the results of the second pre-encoding unit 2 as the average quantization parameter BaseQP. At this time, the image encoding device 200 subjects the average quantization parameter BaseQP to feedback control so as not to exceed the target code quantity.

The code quantity control unit 4 of the image encoding device 200 executes feedback control for each feedback control increment FeedBackUnit made up of multiple MBs. The generated code quantity of an output stream 92 is supplied from the entropy encoding unit 34 to the code quantity control unit 4. The code quantity control unit 4 uses the generated code quantity for each MB (i.e., output of the quantizing unit 23-1 and the entropy code length computing unit 24-1) with the predictive quantization parameter QPd of the second pre-encoding (QPprecode1) to calculate the target code quantity for each feedback control increment FeedBackUnit (hereafter, this will be referred to as "picture target code quantity") from the target code quantity for each picture (hereafter, this will be referred to as "feedback target code quantity").

Now, if we say that the high-precision generated code quantity in the feedback control increment (FeedBackUnit) based on the results of the second pre-encoding unit 2 is PrecodeGeneratedBits_FeedBackUnit[no], and the high-precision generated code quantity for each picture based on the results of the second pre-encoding unit 2 is PrecodeGeneratedBits, the feedback target code quantity in the feedback control increment FeedBackUnit (TargetBit_FeedBackUnit [no]) is obtained with the following expression. Note that no is the number of FeedBackUnit (0 through FeedBackUnit count−1), and TargetBit is a picture target code quantity.

$$TargetBitFeedBackUnit[no] = TargetBit \times PrecodeGeneratedBitsFeedBackUnit[no] / PrecodeGeneratedBits$$

That is to say, the code quantity control unit 4 multiplies the percentage of the high-precision generated code quantity in the feedback control increment (PrecodeGeneratedBits_FeedBackUnit[no]) as to the picture high-precision generated code quantity by the picture target code quantity TargetBit, thereby calculating the feedback target code quantity (TargetBit_FeedBackUnit[no]).

Specifically, the code quantity control unit 4 of the image encoding device 200 executes processing such as the following.

(1) The code quantity control unit 4 divides encoding into first half processing and second half processing, and executes no feedback control with the first half processing. The code quantity control unit 4 determines the target code quantity in the feedback control increment (FeedBackUnit) according to a code quantity ratio in the feedback control increment (FeedBackUnit) of pre-encoding. This code quantity ratio changes according to the fluctuation of the quantization parameter QP. Thus, there is a possibility that upon executing feedback control when the generated code quantity is small at the first half encoding, the image encoding device 200 may change the unnecessary average quantization parameter BaseQP. In other words, the image encoding device 200 selects the basic quantization parameter $QP_{MB}$ so that the main encoding generated code quantity approximates to the picture target code quantity. Accordingly, there is a possibility that upon having the average quantization parameter BaseQP deviate at an early stage of a picture, there may be discrepancy between the main encoding generated code quantity and the picture target code quantity.

(2) The code quantity control unit 4 determines switching timing between the first half processing and the second half processing from both aspects of stabilization of the quantization parameter QP, and suppressing the main encoding generated code quantity to the target code quantity or less. That is to say, the code quantity control unit 4 proceeds to the second half processing in the case of satisfying one of the following conditions shown in (a) and (b).

(a) The code quantity control unit 4 proceeds to the second half processing when encoding a certain percentage or more of a picture, i.e., when encoding a certain number or more of MBs. This is for stabilizing the quantization parameter QP.
  (b) The code quantity control unit 4 compares available remaining code quantity of a portion (MB) that has not been encoded (a value obtained by subtracting the main encoding generated code quantity up to that point from the picture target code quantity), and the target code quantity of a portion (MB) that has not been encoded (a value obtained by subtracting the feedback target code quantity up to that point from the picture target code quantity). Upon the remaining code quantity reaching a certain percentage or less, the code quantity control unit 4 proceeds to the second half processing. This is for suppressing the main encoding generated code quantity to the target code quantity or less.

The condition of (2) (b) is represented with the following expression.

(TargetBit−GeneratedBits_Accum)<(TargetBit−TargetBit_Accum)×ThresholdRatio

Here, TargetBit Accum and GeneratedBits_Accum are the integrated value of the feedback target code quantity up to that point (TargetBit_FeedBackUnit[no]), and the integrated value of the main encoding generated code quantity in the feedback control increment up to that point, respectively. Also, ThresholdRatio is a tolerable deviation percentage. In the case that the main encoding generated code quantity is the target code quantity, the remaining code quantity is equal to the target code quantity of a portion that has not been encoded. On the other hand, in the case that the main encoding generated code quantity exceeds the target code quantity, the remaining code quantity is smaller than the target code quantity of a portion that has not been encoded. For example, when the remaining code quantity reaches less than ThresholdRatio times of the target code quantity of a portion that has not been encoded, the code quantity control unit 4 proceeds to the second half processing. In the case of executing control so that the generated code quantity has to be less than the target code quantity, the code quantity control unit 4 sets ThresholdRatio to less than 1. Thus, when the generated code quantity of a portion that has been encoded is less than the target code quantity, and also approaches this target code quantity, the code quantity control unit 4 proceeds to the second half processing. Also, in the case of executing control so that the generated code quantity approximates to the target code quantity, the code quantity control unit 4 sets ThresholdRatio to greater than 1. Thus, when the generated code quantity of a portion that has been encoded exceeds the target code quantity a certain ratio or more, the code quantity control unit 4 can proceed to the second half processing. It goes without saying that ThresholdRatio may be set to "1".

Thus, the code quantity control unit 4 can enter feedback control before there is discrepancy between the target code quantity and the actual main encoding generated code quantity, and accordingly, can prevent a situation wherein the remaining code quantity is so small that the code quantity control unit 4 cannot control the main encoding generated code quantity, in a sure manner.

In other words, while the main encoding generated code quantity is small, the absolute value of the remaining code quantity is great, and accordingly, the condition is not satisfied unless the discrepancy between the target code quantity and the main encoding generated code quantity is very great, the code quantity control unit 4 does not proceed to the second half processing to enter feedback control. When the main encoding generated code quantity increases, the absolute value of the remaining code quantity is small, and accordingly, the condition is satisfied even if there is some discrepancy between the target code quantity and the main encoding generated code quantity, the code quantity control unit 4 proceeds to the second half processing to enter feedback control.

(3) The code quantity control unit 4 changes the average quantization parameter BaseQP in a direction for increasing this so as to be greater than the basic quantization parameter $QP_{MB}$, only in the case of predicting that the main encoding generated code quantity for each picture will exceed the picture target code quantity, with the second half processing. In the case of increasing the average quantization parameter BaseQP, the code quantity control unit 4 changes the average quantization parameter BaseQP by 1 with one-time feedback processing (i.e., for each feedback control increment). Thus, the code quantity control unit 4 suppresses excessive change in the average quantization parameter BaseQP.

In the case of fitting to one condition of the following (a) and (b), the code quantity control unit 4 predicts that the main encoding generated code quantity for each picture will exceed the picture target code quantity, and increases the average quantization parameter BaseQP.

(a) The code quantity control unit 4 confirms the feedback generated code quantity immediately before (immediately after the processing ends) when encoding in the feedback control increment ends, and compares the feedback generated code quantity (GeneratedBitsFeed- BackUnit[cur]), and the feedback target code quantity (TargetBit_FeedBackUnit[cur]) in accordance with the following expression.

$$\text{GeneratedBits\_FeedBackUnit[cur]} > \text{TargetBit\_FeedBackUnit[cur]}$$

When the feedback generated code quantity (GeneratedBits_FeedBackUnit[cur]) is greater than the feedback target code quantity (TargetBit_FeedBackUnit[cur]), there is a tendency wherein the generated code quantity increases, and accordingly, this gives an indication that there is a possibility that the main encoding generated code quantity generated in the following encoding may exceed the target code quantity. At this time, the code quantity control unit 4 determines whether to increase the average quantization parameter BaseQP. The condition at this time will be shown in the following.

The code quantity control unit 4 subtracts the generated code quantity from the target code quantity regarding a portion that has been encoded at this time, thereby calculating the remainder of the generated code quantity SurplusBits as follows.

$$\text{SurplusBits} = \text{TargetBit\_Accum} - \text{GeneratedBits\_Accum}$$

The code quantity control unit 4 increases the average quantization parameter BaseQP only in the case of predicting that the main encoding generated code quantity in the next feedback control increment will exceed the target code quantity.

The code quantity control unit 4 obtains the maximum code quantity predicted that to exceed the target code quantity in the next feedback control increment (hereafter, this will be referred to as "excessive maximum code quantity") from the target code quantity in the next feedback control increment as follows. Here, MaxErrorRatio is the maximum ratio that the feedback generated code quantity can take as error as to the feedback target code quantity.

$$\text{TargetBit\_FeedBackUnit[next]} \times \text{MaxErrorRatio}$$

The code quantity control unit 4 executes the following determination based on this.

$$\text{SurplusBits} < \text{TargetBit\_FeedBackUnit[next]} \times \text{MaxErrorRatio}$$

The code quantity control unit 4 compares the remainder of the generated code quantity SurplusBits and the excessive maximum code quantity in the next feedback control increment. In the case that the excessive maximum code quantity is greater than the remainder of the generated code quantity SurplusBits, the code quantity control unit 4 determines that there is a possibility that the main encoding generated code quantity of a portion that has been encoded may exceed the target code quantity in the next feedback control increment, and increments the average quantization parameter BaseQP by 1.

That is to say, when "the generated code quantity in the last feedback control increment is greater than the target code quantity of the last feedback control increment", and also "the remainder of the code quantity at this point SurplusBits is smaller than the excessive maximum code quantity regarding which there is a possibility to exceed in the next feedback control increment", the code quantity control unit 4 increments the average quantization parameter BaseQP by 1. This is because there is a tendency for the generated code quantity to increase, and also there is insufficient leeway for the remainder of the code quantity, and accordingly, prediction is made that the final picture generated code quantity will exceed the picture target code quantity.

In other words, when determining that the main encoding generated code quantity of a portion that has been encoded will not exceed the target code quantity in the next feedback control increment even with the current state maintained, the code quantity control unit 4 does not increment the average quantization parameter BaseQP by 1. Thus, even when there are signs that the main encoding generated code quantity of a portion that has been encoded might exceed the target code quantity, the code quantity control unit 4 can avoid excessive reaction, prevent the average quantization parameter BaseQP from increasing excessively unnecessarily, and stabilize the average quantization parameter BaseQP.

(b) In the case of not fitting to (a), i.e., when "the generated code quantity in the last feedback control increment is smaller than the target code quantity of the last feedback control increment", or "the remainder of the code quantity at this point SurplusBits is greater than the excessive maximum code quantity regarding which there is a possibility to exceed in the next feedback control increment", the code quantity control unit 4 confirms whether or not the remainder of the generated code quantity SurplusBits is negative. In the case that SurplusBits is negative, this means that the main encoding generated code quantity when encoding ends exceeds the target code quantity. At this time, the code quantity control unit 4 predicts deviation of the generated code quantity at a remaining encoded portion from the target based on a ratio between the target code quantity and the generated code quantity in the last feedback control increment, such as the following.

The code quantity control unit 4 calculates a ratio between the target code quantity and the generated code quantity in the last feedback control increment Diff_Ratio as follows.

$$\text{Diff\_Ratio} = (\text{GeneratedBits\_FeedBackUnit[cur]} - \text{TargetBit\_FeedBackUnit[cur]}) / \text{TargetBit\_FeedBackUnit[cur]}$$

The code quantity control unit 4 calculates the target code quantity of a remaining encoded portion TargetBit_Rem as follows.

$$\text{TargetBit\_Rem} = \text{TargetBit} - \text{TargetBit\_Accum}$$

The code quantity control unit 4 assumes that the target code quantity of a remaining encoded portion deviates with the same ratio as the ratio between the target code quantity and the generated code quantity in the last feedback control increment Diff_Ratio, and calculates deviation from the target as follows.

$$\text{TargetBit\_Rem} * \text{Diff\_Ratio}$$

The code quantity control unit 4 increments the average quantization parameter BaseQP by 1 in the case that a result obtained by adding an encoded portion and a portion that has not been encoded is positive, and satisfies the following condition.

$$(\text{TargetBit\_Rem} * \text{Diff\_Ratio}) - \text{SurplusBits} > 0$$

When "the generated code quantity of an encoded portion exceeds the target code quantity", and also "the picture predictive generated code quantity obtained from the ratio between the target code quantity and the generated code quantity in the last feedback control increment exceeds the picture target code quantity", the code quantity control unit 4 increments the average quantization parameter BaseQP by 1.

That is to say, even when the generated code quantity at a certain point exceeds the target code quantity, in the event that determination is made that the generated code quantity has a reduction tendency as to the target code quantity, and consequently, the picture generated code quantity does not exceed the picture target code quantity, the code quantity control unit 4 does not increment the average quantization parameter BaseQP by 1.

Thus, when subjecting the input image 91 to the main encoding, the image encoding device 200 does not execute feedback control at the time of starting the main encoding as to a picture, and executes feedback control as the second half processing only when satisfying a certain condition.

That is to say, the image encoding device 200 essentially executes feedback control as to the second half portion of a picture alone. Even with the first half portion of a picture, in the case that the ratio between the generated code quantity of an encoded portion, and the target code quantity exceeds a certain ratio or more, there is a possibility of discrepancy between the subsequent generated code quantity and the target code quantity, and accordingly, the image encoding device 200 executes feedback control.

The image encoding device 200 suppresses fluctuation of the average quantization parameter BaseQP to the minimum as feedback control, and accordingly, only when predicting that the main encoding generated code quantity for each picture is not readily suppressed to the picture target code quantity or less, increments the average quantization parameter BaseQP by 1.

That is to say, in the case that the feedback generated code quantity is greater than the feedback target code quantity, there is a tendency wherein the generated code quality increases as compared to the target code quantity, and also the generated code quantity of an encoded portion may exceed the target code quantity in the next feedback control increment, prediction is made that the final picture generated code quantity will exceed the picture target code quantity, and accordingly, the image encoding device 200 increments the average quantization parameter BaseQP by 1.

Thus, even in the case that there is a tendency wherein the generated code quantity increases as compared to the target code quantity, in the event that there is leeway for the remaining code quantity, the image encoding device 200 can prevent the average quantization parameter BaseQP from being incremented by 1, and accordingly, prevents the average quantization parameter BaseQP from increasing unnecessarily.

Further, in the case that the average quantization parameter BaseQP has not been incremented by 1, and in the event that the generated code quantity of an encoded portion exceeds the target code quantity, and prediction is made that the generated code quantity of the final picture will exceed the picture target code quantity, the image encoding device 200 increments the average quantization parameter BaseQP by 1.

Thus, even in the case that the generated code quantity of an encoded portion exceeds the target code quantity, and in the event that the generated code quantity has a reduction tendency, and prediction is made that the picture generated code quantity will not exceed the picture target code quantity, the image encoding device 200 can prevent the average quantization parameter BaseQP from being incremented by 1, and accordingly, prevents the average quantization parameter BaseQP from increasing unnecessarily.

[2-2. Processing Procedure]

A feedback control processing procedure RT4 will be described with reference to the flowchart in FIG. 6. Upon starting this processing, the code quantity control unit 4 sets the basic quantization parameter $QP_{MB}$ determined with pre-encoding to the average quantization parameter BaseQP (step S31). Subsequently, the code quantity control unit 4 encodes the input image 91 for each feedback control increment FeedBackUnit (step S32).

Subsequently, the code quantity control unit 4 determines whether or not all the MBs of a picture have been encoded (step S33). Here, in the case that all the MBs have been encoded, the code quantity control unit 4 proceeds to the end step to end the processing. On the other hand, in the case that all the MBs have not been encoded, the code quantity control unit 4 proceeds to the next step S34. The code quantity control unit 4 determines whether or not a certain number or more of MBs have been encoded (step S34). This is, as described above, because there is a possibility that upon feedback control being executed when the code quantity is small at the first half of encoding, the average quantization parameter BaseQP may be changed unnecessarily.

Here, in the case that determination is made that a certain number or more of MBs have been encoded, the code quantity control unit 4 proceeds to step S36. On the other hand, in the case that determination is made that a certain number or more of MBs have not been encoded, the code quantity control unit 4 proceeds to step S35, compares an available remaining code quantity of a portion (MB) that has not been encoded (a code quantity obtained by subtracting the generated code quantity up to that point from the target code quantity), and the target code quantity of the portion (MB) that has not been encoded, and determines whether or not a ratio between the remaining code quantity and the target code quantity of the portion that has not been encoded is a certain percentage or less (step S35). Here, in the case that determination is made that the ratio between the remaining code quantity and the target code quantity of the portion that has not been encoded is not a certain percentage or less, the MB that is now under encoding processing is not the second half portion, and also there is no discrepancy between the generated code quantity of the encoded portion and the target code, and accordingly, the code quantity control unit 4 returns to step S32 to repeat the above processing. On the other hand, in the case that determination is made that an available code quantity is a certain percentage or less, the code quantity control unit 4 proceeds to step S36 to execute feedback control.

Subsequently, the code quantity control unit 4 determines whether or not the generated code quantity in the last feedback control increment is greater than the target code quantity in the last feedback control increment (step S36). Here, in the case that determination is made that the generated code quantity in the last feedback control increment is greater than the target code quantity in the last feedback control increment, the code quantity control unit 4 determines whether or not there is a possibility that the remainder of the code quantity at this point may exceed in the next feedback control increment (step S37). In the case that the generated code quantity in the last feedback control increment is smaller than the target code quantity in the last feedback control increment, the code quantity control unit 4 proceeds to step S39.

In the case that determination is made that the remainder of the code quantity at this point may exceed in the next feedback control increment, the code quantity control unit 4 increments the average quantization parameter BaseQP by 1 (step S38), and returns to step S32. On the other hand, in the case that determination is made that the remainder of the code quantity at this point may not exceed in the next feedback control increment, the code quantity control unit 4 proceeds to step S39.

Subsequently, in step S39, the code quantity control unit 4 determines whether or not the generated code quantity of the encoded portion exceeds the target code quantity (step S39).

Here, in the case that determination is made that the generated code quantity of the encoded portion does not exceed the target code quantity, the code quantity control unit 4 returns to step S32 to repeat the above processing.

On the other hand, in the case that determination is made that the generated code quantity of the encoded portion exceeds the target code quantity, the code quantity control unit 4 determines whether or not the picture predictive generated code quantity obtained from the ratio between the target code quantity and the generated code quantity in the last feedback control increment exceeds the picture target code quantity (step S40). Subsequently, in the case that determination is made that the picture predictive generated code quantity does not exceed the picture target code quantity, the code quantity control unit 4 returns to step S32 to repeat the above processing.

In the case that determination is made that the picture predictive generated code quantity exceeds the picture target code quantity, the code quantity control unit 4 increments the average quantization parameter BaseQP by 1 (step S38), and returns to step S32 to repeat the above processing. Thus, the code quantity control unit 4 continues this processing until determination is made in step S33 that all the MBs have been encoded.

As described above, according to the present embodiment, the image encoding device 200 can encode a picture with a fixed length without using binary search, and accordingly, the circuit scale and consumption power can be reduced, and encoding delay can be shortened. At this time, the image encoding device 200 suppresses unnecessary fluctuation of the average quantization parameter BaseQP due to feedback control, and accordingly, even in the event that feedback control has been implemented, the optimal code quantity distribution, i.e., a code quantity distribution for having the picture generated code quantity coincide with the picture target code quantity, and taking visual features into consideration, can be executed.

Note that the present invention is not restricted to the above embodiment, and various modifications and changes can be made without departing from the essence of the present invention.

For example, the above image encoding device and image encoding method may be carried out as a computer program installed in this device, a recording medium in which this program is recorded, a computer program for carrying out this method, or a recording medium in which this program is recorded.

The above-mentioned series of encoding processing can be executed by hardware, and can also be executed by software. In the case of executing the series of encoding processing by software, the image encoding device 100 is formed in virtually in a CPU and RAM. Subsequently, an encoding program stored in ROM is rendered in the RAM, whereby the encoding processing is executed.

[2-3. Operation and Advantage]

With the above arrangement, the image encoding device 200 determines the basic quantization parameter $QP_{MB}$ serving as a basic quantizing factor regarding which is predicted that the main encoding generated code quantity for each picture when encoding the input image 91 will approximate to the picture target code quantity.

The image encoding device 200 encodes the input image 91 for each feedback control increment by executing quantization using the adaptive quantization parameter QPt based on the average quantization parameter BaseQP serving as a usage quantizing factor determined based on at least the basic quantization parameter $QP_{MB}$.

The image encoding device 200 confirms the generated code quantity of the encoded input image 91 for each feedback control increment, and in the case of predicting that the generated code quantity for each image increment will exceed the target code quantity for each image increment, increases the average quantization parameter BaseQP, thereby increasing the value of the adaptive quantization parameter QPt.

Thus, the image encoding device 200 increases the average quantization parameter BaseQP in a limited manner in a state wherein the main encoding generated code quantity for each picture is adjusted beforehand so as to be approximate to the picture target code quantity, whereby the value of the quantization parameter QP (adaptive quantization parameter QPt) to be used can be prevented from deviating unnecessarily.

With an encoding method accompanied with quantization such as AVC or the like, deterioration in image quality due to encoding being executed multiple times has been confirmed. In order to prevent this deterioration in image quality, a technique called back search has been proposed wherein the quantization parameter QP used at the time of the last encoding is detected, and is used again (e.g., see Patent Document 2).

Patent Document 2: International Application No. PCT/JP2008/066917

With this back search, a detection range of back search is set based on the predictive quantization parameter QPd, whereby processing can be simplified by restricting the search range of back search.

The image encoding device 200 can suppress fluctuation of the quantization parameter QP to be used as much as possible, and accordingly, the quantization parameter QP to be used can be prevented from deviating from the search range of back search, and a detection rate of back search can be prevented from deteriorating.

In the case that there is a tendency wherein the feedback generated code quantity for each feedback control increment increases, and there is insufficient leeway for also the remainder of a code quantity obtained by subtracting the generated code quantity of an encoded portion from the target code quantity of the encoded portion with a picture that is an image increment, the image encoding device 200 predicts that the picture generated code quantity will exceed the picture target code quantity.

When the generated code quantity in the last feedback control increment is greater than the target code quantity in the last feedback control increment, the image encoding device 200 determines that there is a tendency wherein the generated code quantity for each feedback control increment increases.

When the generated code quantity in the next feedback control increment is smaller than the excessive maximum code quantity regarding which there is a possibility that may exceed the target code quantity, the image encoding device 200 determines that there is insufficient leeway for the remainder of the code quantity.

Thus, the image encoding device 200 increases the average quantization parameter BaseQP only in a limited case that there is a tendency wherein the feedback generated code quantity increases, and there is insufficient leeway for the remainder of the code quantity, whereby unnecessary fluctuation of the average quantization parameter BaseQP can be prevented.

When assuming that the generated code quantity of an encoded portion of a picture exceeds the target code quantity of this encoded portion, and also a ratio between the target code quantity and the generated code quantity does not change, in the event that the picture generated code quantity exceeds the picture target code quantity, the image encoding device 200 predicts that the picture generated code quantity will exceed the picture target code quantity.

In the case that a predictive value of the picture generated code quantity obtained from the ratio between the feedback target code quantity and the feedback generated code quantity in the last feedback control increment (picture predictive generated code quantity) exceeds the target code quantity, when assuming that the ratio between the target code quantity and, the generated code quantity does not change, the image encoding device 200 determines that the picture generated code quantity will exceed the picture target code quantity.

Thus, the image encoding device 200 increases the average quantization parameter BaseQP only in a limited case that the picture generated code quantity exceeds the picture target code quantity in the event that the ratio between the feedback generated code quantity and the current state of the feedback target code quantity is maintained, whereby unnecessary fluctuation of the average quantization parameter BaseQP can be prevented.

The image encoding device 200 predicts whether or not, with the second half portion of a picture, the picture generated code quantity will exceed the picture target code quantity.

Thus, the image encoding device 200 does not execute feedback control with the first half portion where there are many remaining portions to be encoded from now, and fluctuation of the average quantization parameter BaseQP gives great influence to the picture generated code quantity, as much as possible. As a result thereof, the image encoding device 200 can prevent the imbalance of the picture generated code quantity due to the average quantization parameter BaseQP unnecessarily deviating in the first half portion.

In the case that there is discrepancy between the generated code quantity of an encoded portion of a picture and the target code quantity of this encoded portion, the image encoding device 200 predicts whether or not the picture generated code quantity will exceed the picture target code quantity, regardless of the position of the picture.

In the case that the generated code quantity of an encoded portion of a picture is smaller than a value obtained by multiplying the target code quantity of this encoded portion by a tolerable deviating quantity ThresholdRatio, the image encoding device 200 determines that there is discrepancy between the generated code quantity of the encoded portion of the picture and the target code quantity of this encoded portion.

Thus, for example, in the case of failing in estimation of the basic quantization parameter $QP_{MB}$, the image encoding device 200 can execute feedback control even at an early stage of a picture, whereby unexpected situations can also be handled.

In the case of predicting that the picture generated code quantity will exceed the picture target code quantity, the image encoding device 200 increments the average quantization parameter BaseQP by 1.

Thus, the image encoding device 200 can suppress fluctuation of the average quantization parameter BaseQP to the minimum, and stabilize image quality within a picture.

The image encoding device 200 determines the basic quantization parameter $QP_{MB}$ so that the generated code quantity when encoding the input image 91 is smaller than the target code quantity.

Thus, the image encoding device 200 can suppress the picture generated code quantity, thereby facilitating control markedly so that the picture generated code quantity does not exceed the picture target code quantity.

The image encoding device 200 sets a value of less than 1 as a tolerable deviating quantity ThresholdRatio. Thus, in the case that the generated code quantity of an encoded portion is smaller than the target code quantity of this encoded portion, but approximates thereto, the image encoding device 200 can execute feedback control, whereby control can be executed in a sure manner so that the picture generated code quantity does not exceed the picture target code quantity.

The image encoding device 200 determines a predictive quantization parameter QPd predicted to approximate to the basic quantization parameter $QP_{MB}$ based on the generated code quantity calculated by encoding said input image 91 using a quantization parameter QP (selected quantization parameter QP1) covering a wide range, and determines the basic quantization parameter $QP_{MB}$ based on the high-precision generated code quantity calculated by encoding the input image 91 using this predictive quantization parameter QPd, and a quantization parameter QP in the vicinity of this predictive quantization parameter QPd.

Thus, the image encoding device 200 determines the basic quantization parameter $QP_{MB}$ with high precision, whereby the main encoding generated code quantity can be approximated to the picture target code quantity using this basic quantization parameter $QP_{MB}$. Accordingly, the image encoding device 200 only rarely has to have the average quantization parameter BaseQP fluctuate by feedback control, whereby fluctuation of the average quantization parameter BaseQP can be suppressed as much as possible.

According to the above arrangement, the image encoding device 200 executes feedback control so as to increase the average quantization parameter BaseQP only in the case of predicting that the picture generated code quantity will exceed the picture target code quantity, from the generated code quantity of an encoded portion and the target code quantity of this encoded portion.

Thus, the image encoding device 200 can suppress the picture generated code quantity to the picture target code quantity or less in a sure manner while suppressing fluctuation of the average quantization parameter BaseQP to the minimum. Thus, the present invention can realize an image processing device and an image processing method whereby the picture generated code quantity can be suppressed to the picture target code quantity or less in a sure manner while maintaining uniform image quality.

<3. Other Embodiments>

Note that, with the above second embodiment, the case made up of a there-pass configuration has been described wherein the image encoding device 200 determines the predictive quantization parameter QPd based on the results of the first pre-encoding unit 1, and determines the basic quantization parameter $QP_{MB}$ based on the results of the second pre-encoding unit 2. The present invention is not restricted to this, and for example, the present invention may be applied to an image encoding device made up of a two-pass configuration wherein the first pre-encoding unit 1 determines the basic quantization parameter $QP_{MB}$, or a four-pass or more configuration.

Also, with the above first and second embodiments, a case has been described wherein the input image 91 is encoded with intra-screen prediction, orthogonal transform according to DCT, quantization, and encoding according to CAVLC or CABAC. The present invention is not restricted to this, and any one may be omitted, as long as the input image 91 is subjected to at least quantization. Also, the input image 91 may be encoded using an encoding method other than those.

Further, with the above second embodiment, a case has been described wherein the feedback generated code quantity is confirmed for each feedback control increment made up of multiple MBs. The present invention is not restricted to this, and the size of the feedback control increment is not restricted, and for example, the feedback control increment may be set to an MB or slice.

Further, with the above second embodiment, a case has been described wherein the generated code quantity for each picture serving as an image increment is suppressed to the target code quantity or less. The present invention is not restricted to this, and for example, the generated code quantity for each picture or for every multiple pictures serving as an image increment may be suppressed to the target code quantity or less.

Further, with the above second embodiment, a case has been described wherein the average quantization parameter BaseQP is incremented by 1 regarding feedback control as to a single feedback control increment. The present invention is not restricted to this, and the average quantization parameter BaseQP may be incremented by two or more according to conditions.

Further, with the above first and second embodiments, a case has been described wherein, in the case that the last feedback generated code quantity exceeds the feedback target code quantity, determination is made that there is a tendency wherein the generated code quantity for each feedback control increment increases. The present invention is not restricted to this, and for example, determination may be made that there is a tendency wherein the generated code quantity for each feedback control increment increases depending on whether or not the generated code quantity exceeds the target code quantity for every the last multiple feedback control increments.

Further, with the above second embodiment, a case has been described wherein when falling under one of (3) (a) and (3) (b), prediction is made that the generated code quantity for each image increment will exceed the target code quantity for the above each image increment. The present invention is not restricted to this, and prediction may be made that the generated code quantity for each image increment will exceed the target code quantity for the above each image increment, in the case of falling under either one thereof, or by another technique.

Further, with the above second embodiment, a case has been described wherein prediction is made whether or not the picture generated code quantity will exceed the picture target code quantity from the ratio between the last feedback generated code quantity and the feedback target code quantity. The present invention is not restricted to this, and for example, prediction may be made whether or not the picture generated code quantity will exceed the picture target code quantity from the ratio between the target code quantity and the generated code quantity for every multiple feedback control increments or for each MB.

Further, with the above second embodiment, a case has been described wherein when entering the second half portion of a picture, feedback control is executed automatically. The present invention is not restricted to this, and for example, feedback control may be executed only in the case that the generated code quantity of an encoded portion exceeds the target code quantity.

Further, with the above second embodiment, a case has been described wherein feedback control is executed in the case that the generated code quantity of an encoded portion exceeds the target code quantity. The present invention is not restricted to this, and feedback control may be executed according to other various types of conditions.

Further, with the above second embodiment, a case has been described wherein the basic quantization parameter $QP_{MB}$ is determined so that the main encoding generated code quantity is somewhat less than the picture target code quantity. The present invention is not restricted to this, the basic quantization parameter $QP_{MB}$ may be determined so that the main encoding generated code quantity is the most approximate to the picture target code quantity.

Further, with the above second embodiment, a case has been described wherein the present invention has been applied to AVC. The present invention is not restricted to this, the present invention may be applied to various types of encoding method for selecting a VLC table adaptively. For example, in the case that the present invention is applied to MPEG-2, a quantizing scale is employed as a quantizing factor.

Further, with the above second embodiment, a case has been described wherein the image encoding device 200 serving as an image processing device is configured of the first pre-encoding unit 1, the second pre-encoding unit 2, and the code quantity control unit 4, serving as basic quantizing factor determining units, the main encoding unit 3 serving as an encoding unit, and the code quantity control unit 4 serving as a feedback control unit. The present invention is not restricted to this, and the image processing device of the present invention may be configured of basic quantizing factor determining units according to other types of configurations, an encoding unit, and a feedback control unit.

The invention claimed is:

1. An image processing device comprising:
a basic quantizing factor determining unit configured to determine a basic quantizing factor regarding which is predicted that the generated code quantity for each image increment when encoding an input image will approximate to the target code quantity for said each image increment;
an encoding unit configured to encode said input image for each feedback control increment by executing quantization using a usage quantizing factor determined based on at least said basic quantizing factor; and
a feedback control unit configured to confirm the generated code quantity of said input image encoded by said encoding unit for said each feedback control increment, and in the case of predicting that the generated code quantity for said each image increment will exceed the target code quantity for said each image increment, increase said usage quantizing factor,
wherein, to stabilize the usage quantizing factor and to suppress the generated code quantity to the target code quantity, the feedback control unit divides the encoding process of the encoding unit into a first half processing during which a feedback control by the feedback control unit is not executed and a second half processing during which the feedback control is executed, and the feedback control unit switches from the first half processing to the second half processing when the number of encoded image increments is greater than a first predetemined amount or when the number of to-be-encoded image increments is less than a second predetermined amount.

2. The image processing device according to claim 1, wherein said feedback control unit predicts that the generated code quantity for said each image increment will exceed the target code quantity for said each image increment, in the case that the generated code quantity for said each feedback control increment tends to increase, and also there is insufficient leeway for a remaining code quantity obtained by subtracting the generated code quantity of a portion encoded from the target code quantity of a portion encoded with said each image increment.

3. The image processing device according to claim 2, wherein said feedback control unit determines that the generated code quantity for said each feedback control increment tends to increase when the generated code quantity of the last feedback control increment is greater than the target code quantity of the last feedback control increment.

4. The image processing device according to claim 3, wherein said feedback control unit determines that there is insufficient leeway for said remaining code quantity when said remaining code quantity is smaller than an excessive maximum code quantity regarding which there is a possibility that the generated code quantity with the next feedback control increment May exceed the target code quantity.

5. The image processing device according to claim 2, wherein said feedback control unit predicts that the generated code quantity for each image increment will exceed the target code quantity for said each image increment, in the case that the generated code quantity of a portion encoded with said image increment exceeds said target code quantity of this encoded portion, and also the generated code quantity for each image increment exceeds the target code quantity for said each image increment when assuming that a ratio between the target code quantity and the generated code quantity does not change.

6. The image processing device according to claim 5, wherein said feedback control unit determines that the generated code quantity for each image increment exceeds the target code quantity for said each image increment when assuming that a ratio between said target code quantity and the generated coded quantity does not change, in the case that the predictive value of the generated code quantity for each image increment obtained from the ratio between the target code quantity and the generated code quantity of the last feedback control increment exceeds the target code quantity.

7. The image processing device according to claim 6, wherein said feedback control unit predicts whether or not the generated code quantity for said each image increment will exceed the target code quantity for said each image increment, with a latter-half portion of said image unit.

8. The image processing device according to claim 7, wherein said feedback control unit predicts whether or not the generated code quantity for said each image increment will exceed the target code quantity for said each image increment regardless of the position of said image increment, in the case that there is discrepancy between the generated code quantity of a portion encoded with said image unit and the target code quantity of this encoded portion.

9. The image processing device according to claim 1, wherein said feedback control unit determines that there is discrepancy between the generated code quantity of a portion encoded with said image increment and the target code quantity of this encoded portion, in the case that the generated code quantity of a portion encodes with said image increment is smaller than a value obtained by multiplying a tolerable deviating quantity as to the target code quantity of this encoded portion.

10. The image processing device according to claim 1, wherein said feedback control unit increases said usage quantizing factor by one, in the case of predicting that the generated code for said each image increment will exceed the target code quantity for said each image increment, 11. The image processing device according to claim 9, wherein said feedback control unit determines said basic quantizing factor so as to reduce the generated code quantity when encoding said input image smaller than said target code quantity, 12. The image processing device according to claim 11, wherein said tolerable deviating value is made up of a value less than 1.

13. The image processing device according to claim 1, wherein said encoding unit takes said basic quantizing factor determined for said each image increment as an average quantizing factor, and uses a value to which the offset according to activity as to this average quantizing factor is added as said usage quantizing factor; and wherein said feedback control unit increases said usage quantizing factor by increasing said average quantizing factor.

14. The image processing device according to claim 7, wherein said basic quantizing factor determining unit determines a predictive quantizing factor regarding which is predicted to approximate to a basic quantizing factor based on the generated code quantity calculated by encoding said input image using a quantizing factor covering a wide range, and determines said basic quantizing factor based on the generated code quantity calculated by encoding said input image using this predictive quantizing factor, and a quantizing factor in the vicinity of this predictive quantizing factor.

15. An image processing method comprising:
a basic quantizing factor determining step arranged to determine a basic quantizing factor regarding which is predicted that the generated code quantity for each image increment when encoding an input image will approximate to the target code quantity for said each image increment;
an encoding step arranged to encode said input image for each feedback control increment to generate an encoded stream by executing quantization using a usage quantizing factor determined based on at least said basic quantizing factor; and
a feedback control step arranged to confirm the generated code quantity of said input image encoded in said encoding step for said each feedback control increment, and in the case of predicting that the generated code quantity for said each image increment will exceed the target code quantity for said each image increment, increase said usage quantizing factor, wherein, to stabilize the usage quantizing factor and to suppress the generated code quantity to the target code quantity, the feedback control step divides the encoding process of the encoding step into a first half processing during which a feedback control by the feedback control step is not executed and a second half processing during which the feedback control is executed, and the feedback control step switches from the first half processing to the second half processing when the number of encoded image increments is greater than a first predetermined amount or when the number of to-be-encoded image increments is less than a second predetermined amount.

* * * * *